United States Patent
Takahashi

(10) Patent No.: US 7,602,536 B2
(45) Date of Patent: Oct. 13, 2009

(54) IMAGE READING APPARATUS

(75) Inventor: Osamu Takahashi, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1090 days.

(21) Appl. No.: 11/041,255

(22) Filed: Jan. 25, 2005

(65) Prior Publication Data
US 2005/0162708 A1 Jul. 28, 2005

(30) Foreign Application Priority Data
Jan. 26, 2004 (JP) ............................. 2004-017115

(51) Int. Cl.
H04N 1/04 (2006.01)
(52) U.S. Cl. .................. 358/474; 358/482; 358/451
(58) Field of Classification Search ................ 358/443, 358/400, 474, 475, 476, 479, 486, 487, 482, 358/483, 496, 497, 450, 451, 404, 444, 1.2, 358/1.6, 1.12, 1.16, 468, 463; 348/230.1, 348/231.99; 382/312; 250/599.04, 559.05, 250/559.06, 559.07, 559.08
See application file for complete search history.

(56) References Cited

U.S. PATENT DOCUMENTS 4,676,623 A * 6/1987 Akashi et al. ................ 396/92
5,604,534 A * 2/1997 Hedges et al. .............. 348/144
2003/0210211 A1* 11/2003 Moon ......................... 345/75.2
2004/0080652 A1* 4/2004 Nonaka et al. .............. 348/321

FOREIGN PATENT DOCUMENTS

| JP | 403121415 A | * | 5/1991 |
| JP | 09-130592 | | 5/1997 |
| JP | 09-247385 | | 9/1997 |

* cited by examiner

Primary Examiner—Jerome Grant, II
(74) Attorney, Agent, or Firm—Oliff & Berridge, PLC

(57) ABSTRACT

The image reading apparatus comprising an image sensor with plurality of reading devices one-dimensionally aligned in a main scanning direction allows reducing memory space necessary for image reduction process. Pixel signals in each channel read by a line image sensor are converted into pixel data in AFE, valid pixel data are captured therefrom, and then inputted into a reduction process unit. The reduction process unit skips pixel data sequentially inputted therein with predetermined intervals based on preset data reduction rate. Subsequently, pixel data after reduction process, that is only unskipped pixel data, are written into a memory via writing unit and memory control unit.

8 Claims, 13 Drawing Sheets

FIG.9A

CH1 OUTPUT PIXEL DATA(NUMBER OF VALID PIXEL:8)

| | 4 | 5 | 6 | 7 | 8 | 9 | 10 | 11 |
|---|---|---|---|---|---|---|---|---|
| INITIAL VALUE 255 | 255 | 212 | 169 | 126 | 83 | 40 | 253 | 210 |
| | 213 | 213 | 213 | 213 | 213 | 213 | 213 | 213 |
| | 468 | 425 | 382 | 339 | 296 | 253 | 466 | 423 |
| | 1 | 1 | 1 | 1 | 1 | 0 | 1 | 1 |
| | 212 | 169 | 126 | 83 | 40 | 253 | 210 | 167 |

AUGEND (A):
VARIABLE PARAMETER +1 (B):
ADDITION RESULT (A+B):
CARRY BIT:
LOW 8-BITS OF ADDITION RESULT:

↓ INITIAL VALUE OF AUGEND FOR NEXT DEVICE
167

FIG.9B

CH2 OUTPUT PIXEL DATA(NUMBER OF VALID PIXEL:12)

| | 12 | 13 | 14 | 15 | 16 | 17 | 18 | 19 | 20 | 21 | 22 | 23 |
|---|---|---|---|---|---|---|---|---|---|---|---|---|
| INITIAL VALUE 167 | 167 | 124 | 81 | 38 | 251 | 208 | 165 | 122 | 79 | 36 | 249 | 206 |
| | 213 | 213 | 213 | 213 | 213 | 213 | 213 | 213 | 213 | 213 | 213 | 213 |
| | 380 | 337 | 294 | 251 | 464 | 421 | 378 | 335 | 292 | 249 | 462 | 419 |
| | 1 | 1 | 1 | 0 | 1 | 1 | 1 | 1 | 1 | 0 | 1 | 1 |
| | 124 | 81 | 38 | 251 | 208 | 165 | 122 | 79 | 36 | 249 | 206 | 163 |

AUGEND (A):
VARIABLE PARAMETER +1 (B):
ADDITION RESULT (A+B):
CARRY BIT:
LOW 8-BITS OF ADDITION RESULT:

↓ INITIAL VALUE OF AUGEND FOR NEXT DEVICE
163

FIG.9C

CH3 OUTPUT PIXEL DATA(NUMBER OF VALID PIXEL:8)

| | 24 | 25 | 26 | 27 | 28 | 29 | 30 | 31 | |
|---|---|---|---|---|---|---|---|---|---|
| INITIAL VALUE 163 | 163 | 120 | 77 | 34 | 247 | 204 | 161 | 118 | 75 |
| | 213 | 213 | 213 | 213 | 213 | 213 | 213 | 213 | |
| | 376 | 333 | 290 | 247 | 460 | 417 | 374 | 331 | |
| | 1 | 1 | 1 | 0 | 1 | 1 | 1 | 1 | |
| | 120 | 77 | 34 | 247 | 204 | 161 | 118 | 75 | |

AUGEND (A):
VARIABLE PARAMETER +1 (B):
ADDITION RESULT (A+B):
CARRY BIT:
LOW 8-BITS OF ADDITION RESULT:

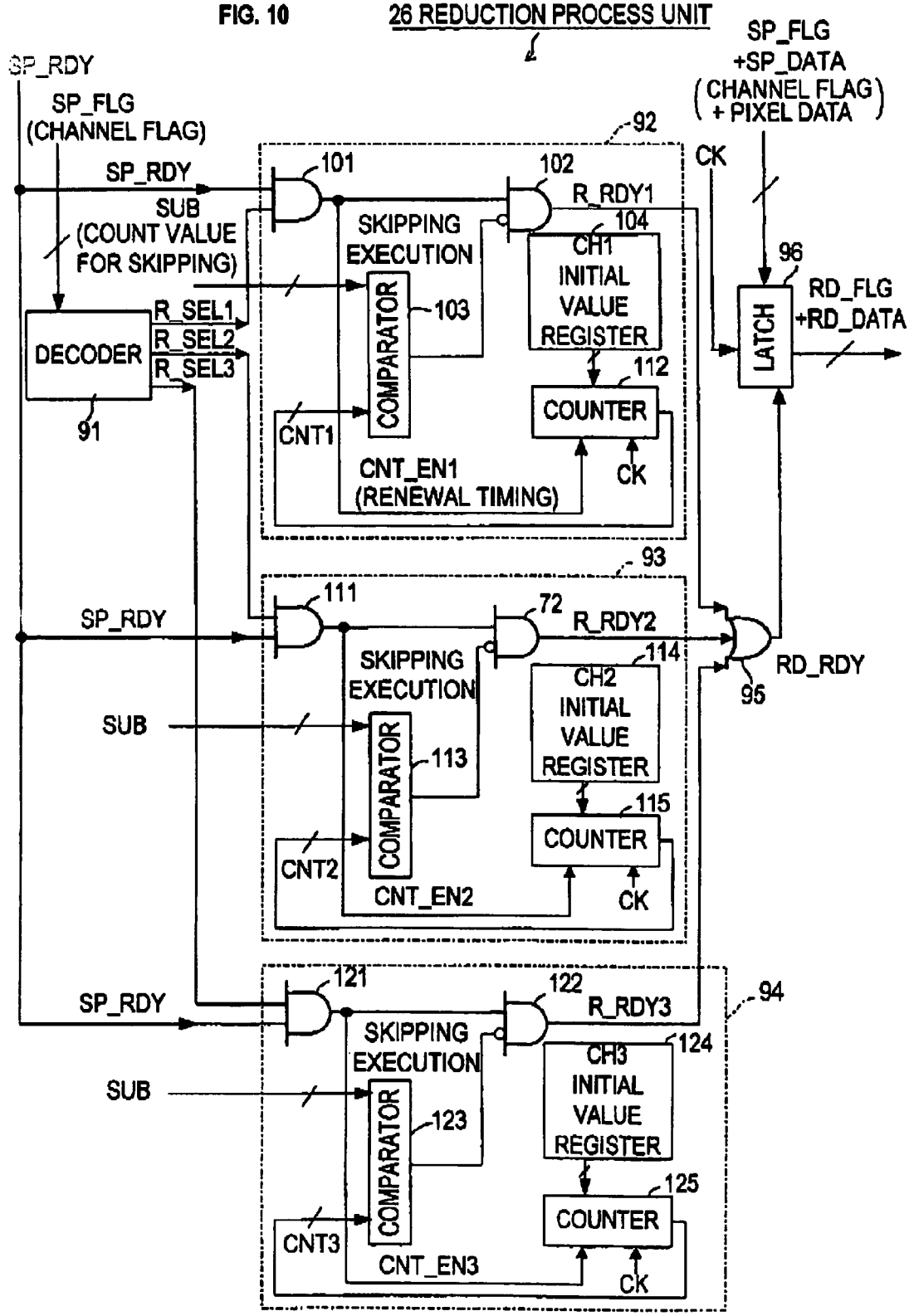

FIG.12A

CH1 OUTPUT PIXEL DATA (NUMBER OF VALID PIXEL:8)

| | 4 | 5 | 6 | 7 | 8 | 9 | 10 | 11 |
|---|---|---|---|---|---|---|---|---|
| COUNTER | 0 | 1 | 2 | 3 | 4 | 5 | 0 | 1 |
| SKIPPING POINT (SUB) | 5 | 5 | 5 | 5 | 5 | 5 | 5 | 5 |
| DETERMINATION (R_RDY1) | 1 | 1 | 1 | 1 | 1 | 0 | 1 | 1 |

INITIAL VALUE: 0
↓ COUNTER INITIAL VALUE FOR NEXT: 2

FIG.12B

CH2 OUTPUT PIXEL DATA (NUMBER OF VALID PIXEL:12)

| 12 | 13 | 14 | 15 | 16 | 17 | 18 | 19 | 20 | 21 | 22 | 23 |
|---|---|---|---|---|---|---|---|---|---|---|---|
| 2 | 3 | 4 | 5 | 0 | 1 | 2 | 3 | 4 | 5 | 0 | 1 |
| 5 | 5 | 5 | 5 | 5 | 5 | 5 | 5 | 5 | 5 | 5 | 5 |
| 1 | 1 | 1 | 0 | 1 | 1 | 1 | 1 | 1 | 0 | 1 | 1 |

COUNTER / SKIPPING POINT (SUB) / DETERMINATION (R_RDY2)

INITIAL VALUE: 2
↓ COUNTER INITIAL VALUE FOR NEXT: 2

FIG.12C

CH3 OUTPUT PIXEL DATA (NUMBER OF VALID PIXEL:8)

| 24 | 25 | 26 | 27 | 28 | 29 | 30 | 31 | |
|---|---|---|---|---|---|---|---|---|
| 2 | 3 | 4 | 5 | 0 | 1 | 2 | 3 | |
| 5 | 5 | 5 | 5 | 5 | 5 | 5 | 5 | |
| 1 | 1 | 1 | 0 | 1 | 1 | 1 | 1 | 4 |

CONTER / SKIPPING POINT (SUB) / DETERMINATION (R_RDY3)

INITIAL VALUE: 2

IMAGE READING APPARATUS

BACKGROUND OF THE INVENTION

1. Field of the Invention

This invention relates to an image reading apparatus that reads an image by using an image sensor with light receivers aligned one dimensionally.

2. Background Art

An image reading apparatus that reads out an image from an original by using an image sensor with one-dimensionally-aligned light receivers has been known. This type of image reading apparatus is generally installed in a photo copier, facsimile, scanner, or a multifunction machine wherein functions of these devices are combined in one machine.

For an image sensor an image sensor with CCD (Charge Coupled Devices) method, or CIS (Contact Image Sensor) are, for example, known. Amongst theses image sensors, especially CIS are often used, since they does not require complex optical systems for size reduction of a subject image while this system is necessary for an image sensor with CCD method to read out an image, and consequently size of CIS can be considerably smaller and lighter than size of an image sensor with CCD method.

Following constitutions are generally known as specific structures of CIS. One is a single output type image, sensor (CIS) which is constituted with a single reading device wherein light receivers are one dimensionally aligned. In this single output type image sensor, a length in main scanning direction of the single reading device (a same direction as an alignment direction of the light receivers) is a length the image sensor can read in one line of an image in the main scanning direction. Pixel signals read out by the single reading device are sequentially outputted by this single reading device.

Another constitution is a parallel output type image sensor (CIS) which is constituted with plurality of reading devices with one dimensionally aligned light receivers provided in a main scanning direction of an original. In this parallel output type image sensor, one line of an image in the main scanning direction is divided by the reading devices and respectively read out. Pixel signals read out by reading devices are respectively outputted in parallel. It is possible, with this type of parallel output type image sensor, to make reading time for reading out one line of an image shorter, compared to reading time with the single output type image sensor, as disclosed in Unexamined Japanese Patent Publication No.9-130592.

For example, in CIS wherein two reading devices are adjacently disposed so that light receivers of each reading device are aligned one dimensionally in a main scanning direction, data read out from left half of an original and data read out from right half of the original can be simultaneously outputted. Consequently, reading an original can be conducted fast. However, since the data from the left half and the right half of an original are respectively outputted form each reading device, positional relation of pixel signals sequentially obtained from these reading devices are not consecutive.

In order to match the pixel signals sequentially read in a consecutive state with one dimensional alignment order in the main scanning direction of respective light receivers constituting an image sensor (to be referred to as alignment order in the main scanning direction), JP 9-130592 discloses that all obtained pixel data are once stored into a memory, and read out in the main scanning direction by controlling reading address.

For image reduction process (or low resolution process), pixel skipping is generally conducted in specific cycle so that an image is reduced by a target rate. JP 9-130592 discloses that pixel data can be read out while being skipped in a cycle corresponding to a rate of reduction by controlling an address during reading.

SUMMARY OF THE INVENTION

However, by the reduction method disclosed in JP 9-130592, it is difficult to reduce memory space necessary for storing pixel data. An example can be given by a multifunction machine with CIS capable of reading an original with a B4 size width, in maximum, nevertheless capable of recording on a recording medium A4 size width in maximum. In this multifunction machine, readout resolution in the main scanning direction of an original is low (e.g. 200 dpi) for facsimile transmission, and recording resolution on a recording medium in a width direction of A4 size, normally used in offices, is high (e.g. 600 dpi) for photocopy, output from printer, and facsimile reception.

For this machine, an image sensor (CIS) with readable range up to B4 size width, and reading resolution at 600 dpi is preferably used. When this type of CIS is used, resolution conversion from 600 dpi to 200 dpi (reduction by ⅓) for facsimile transmission is conducted, and transmission data are formed at 200 dpi in the main scanning direction with B4 size width. For photocopying, size conversion from B4 to A4 (reduction by ⅚) is conducted in order to record pixel data read out from an original in B4 size onto a recording medium in A4 size. Thus, recording data are formed at 600 dpi in the main scanning direction with A4 size.

Accordingly, two reading functions can be achieved with a memory with storage capacity at 600 dpi per line in the main scanning direction A4 size width for transmission data storage, for facsimile transmission, and data recording for photocopying. However, if rearrangement of all pixel data readout by CIS and once stored into a memory should be conducted, a memory with storage capacity at 600 dpi per line in B4 size width needs to be provided.

That is, although the maximum recording size is A4 size in width, if the maximum data storage size is B4 size in width, a memory with large capacity needs to be provided to store pixel data of an original in B4 size width. Since larger memory costs more, providing a memory corresponding to the maximum size of a recorded medium for reading, regardless of the maximum size of a draft for recording, has prevented to lower cost.

The present invention was made in order to solve the above and other issues, and a purpose is to reduce memory space necessary for image reduction in an image reading apparatus provided with an image sensor constituted with plurality of reading devices aligned one dimensionally in a main scanning direction.

To solve above-described and other issues, the image reading apparatus of the present invention comprising: an image sensor with plurality of line sensors disposed in a direction, each of the line sensors having light receivers for each pixel aligned in the direction; output devices for respective line sensors that output pixel signals obtained from the respective light receivers constituting the line sensors in an alignment order of the light receivers; a conversion device that converts pixel signals outputted from the respective output devices into digital pixel data and outputs the pixel data; a data storage memory capable of storing pixel data; a writing device that writes pixel data outputted from the reduction devices into the data storage memory; a data reduction rate setting device; and reduction devices respectively provided for the respective line sensors.

The data reduction rate setting device sets data reduction rate indicating the rate of pixel data to be written by the writing device amongst the pixel data outputted from the conversion device. The reduction devices provided for respective line sensors take pixel data from corresponding line sensor amongst the pixel data outputted form the conversion device. Amongst the respective taken pixel data, the reduction devices output predetermined number of pixel data corresponding to data reduction rate set in the data reduction rate setting device. The writing device writes pixel data outputted from the reduction devices into the data storage memory.

In the entire image sensor, the light receivers are aligned in one line (one-dimensionally) in the main scanning direction by the alignment order of the line sensors in the main scanning direction. Pixel signals from respective line sensors are outputted in alignment order of the light receivers (for example, in alignment order in the main scanning direction) by corresponding output devices, and converted into pixel data in the conversion device.

The pixel data from the conversion device are respectively taken into corresponding reduction devices. The reduction devices are respectively constituted to take pixel data outputted only from corresponding line sensors and converted in the conversion device.

In order to determine corresponding reduction device of pixel data outputted from the conversion device, i.e. corresponding line sensor of the pixel data, it is possible, for example, to constitute the conversion device to output some data indicating corresponding line sensor together with pixel data, and to constitute reduction devices to determine whether or not to take the pixel data based on the data outputted with the pixel data. It is also possible to constitute the conversion device to directly output pixel data only to corresponding reduction device. Furthermore, it is also possible to provide identification devices between the conversion device and respective reduction devices to identify output destination, and pixel data are outputted to one of the reduction devices corresponding to one of the identification devices indicating to be the output destination. It should be noted that output of pixel data from the conversion device can be serial output wherein pixel data are sequentially outputted one by one in serial data sequence, or parallel output wherein pixel data are outputted in parallel from each line sensor (i.e. from each reduction device).

Amongst obtained pixel data, the reduction devices respectively output only predetermined number of pixel data according to data reduction rate set in the data reduction rate setting device. Thereby, not all pixel data from the conversion device are stored into the data storage memory by the writing device, except when the data reduction rate is set to 1 (same size), but only predetermined number (according to data reduction rate) of pixel data outputted from the reduction devices are stored into the data storage memory.

That is to say, according to the image reading apparatus constituted as above, prior to the writing device writing pixel data into the data storage memory, the reduction devices respectively conduct reduction process (i.e. output only predetermined number of pixel data based on data reduction rate). Therefore, memory space necessary for pixel data in one line of an image can be as large as only for pixel data in a result of reduction process in the main scanning direction, and it is possible to reduce the memory space.

Consequently, even in a case of a multifunction machine described above wherein CIS provided therein can read an original in B4 size but record on a recording medium in A4 size in maximum, it is not necessary to store all pixel data in B4 size, and a data storage memory capable of storing pixel data in A4 size per line can be sufficient.

Moreover, in a case of a multifunction machine having same maximum size for both reading and recording, when reduction is conducted, only pixel data after reduction process are written in a data storage memory. Consequently, although it is not possible to reduce physical memory capacity for recording pixel data, it is possible to reduce access amount to the memory by a device that controls memory, such as CPU, and to reduce processing load on CPU.

It should be noted that the reduction process is not limited to a process for reducing a read image and recording thereof, but a process for reducing resolution of a read image and recording thereof is also included.

Accordingly, the reduction devices may be constituted to take the pixel data from the conversion device in alignment order, of the light receivers of corresponding light sensors, and sequentially output the taken pixel data while skipping thereof with predetermined intervals according to the data reduction rate. For example, when the data reduction rate is set to ½, the reduction devices repeats skipping and unskipping the pixel data taken in the alignment order during output.

By the image reading apparatus constituted as above, since pixel data are skipped with predetermined intervals according to data reduction rate, when a reduced image or an image with low resolution is recorded on a recording medium, an image with preferable image quality can be obtained.

When pixel data are skipped with predetermined intervals as described above, in aspect of each pixel data derived from each line sensor, skipping is conducted with predetermined intervals. However, in aspect of pixel data derived from the entire image sensor, that is when considering pixel data for one line of an image, pixel data are not necessarily skipped with predetermined intervals. In other words, if, for example, timing for first skipping in all the line sensors are set the same, depending on the number of light receivers constituting each line sensor, skipping intervals of pixel data in connecting portions of line sensors with adjacent line sensors can be different from the above-described predetermined intervals.

Accordingly, the image reading apparatus of the present invention may comprise an offset setting device that sets timings for skipping for each reduction device so that when pixel data respectively outputted from respective reduction devices are aligned in the alignment order of the line sensors and in the alignment order of the light receivers, pixel data for one line of an image as a whole can be skipped with the predetermined intervals.

With the image reading apparatus constituted as above, not only skipping intervals in pixel data derived from each line sensor can be predetermined intervals, but also all pixel data in one line of an image can be skipped with predetermined intervals. Thereby, more preferable image quality can be obtained when reduced image or an image with low resolution is recorded on a recording medium.

Specifically, the reduction devices of the present invention may respectively comprise: an addition device with n+1 bits (n is a natural number) that adds a n-bits augend and a n-bits additional value every time the pixel data from the conversion device are taken therein, and determines low n-bits of result from the addition as the augend in next addition; a determination device that determines whether or not a carry is generated from the addition conducted by the addition device; and a skip setting device that skips the pixel data to which determination indicating a carry is not generated is made by the determination device, and prevents the skipped pixel data from being outputted to the writing device. Thereby, initial values of the additional value and the augend are respectively set in a manner so that a carry is not generated in every predetermine interval in the addition conducted by the addition device every time the pixel data are inputted.

That is, respective reduction devices conduct the addition every time corresponding pixel data are inputted, and when a carry is generated, the reduction devices output the corresponding pixel data to the writing device. When a carry is not generated in the addition, the reduction devices skip (do not output) the pixel data. Specifically, when data reduction rate is, for example, ½, if the initial values of the additional value and the augend are set so as to generate a carry in every other addition, skipping and unskipping are alternatively repeated.

Accordingly, in the image reading apparatus constituted as above, conduction of skipping is determined based on presence/absence of a carry in an addition conducted every time pixel data are, inputted. Therefore, the determination device can be relatively easily constituted, and this constitution allows simplifying the structure of the entire apparatus.

In this case, the respective reduction devices more preferably comprise an additional value setting device that sets the additional value, and an offset setting device that sets initial value of the augend.

The additional value setting device sets integer portion of multiplication result, obtained from multiplying the data reduction rate by $2^n$, as the additional value. That is, the additional value is a specific value defined according to the data reduction rate.

The offset setting device sets predetermined value in 0 to $2^n-1$ as the initial value of the augend for the reduction device corresponding to a first line sensor amongst the line sensors aligned in the direction. The offset setting device furthermore sets residue in division result obtained from following formula (1) conducted in the reduction device as the initial value of the augend in the reduction device corresponding to next line sensor.

$$(b \cdot k + a)/2^n \quad (1)$$

In the above formula, b represents the additional value, k represents the number of valid pixel in order to output only valid pixel signals derived from, light receivers constituting the line sensor corresponding to the reduction device, and a represents the initial value of the augend set in the reduction device.

The "first line sensor" refers to a line sensor from which reading in the main scanning direction is initiated first disposed on one end of the line image sensor comprising plurality of line sensors, when an image is read from one end in the main scanning direction.

Based upon following notion, the initial value of the augend is obtained with the above formula (1): if calculation result (result of addition by the addition device) obtained after reduction process for last pixel data for the line sensor is known, the initial value of augend for next line sensor disposed adjacent to the line sensor in the main scanning direction can be set with the low n-bit of the calculation result.

In one line sensor, every time pixel, data are inputted, constant value, i.e. the additional value is added, and when a carry is generated from the addition, bits except for a carry bit, are set as next augend. This process is repeated as many times as the number of valid pixel in the line sensor. From division with the above formula (1), the number of carry generation in pixel data derived from the line sensor (the number of pixel data outputted to the writing device) can be obtained from the quotient, and low n-bit after reduction process for the last pixel data can be obtained from the residue. Therefore by setting the residue as the initial value of augend for next line sensor, skipping can be conducted with the predetermined intervals without having irregular intervals between pixel data of adjacent line sensors.

Consequently, with the image reading apparatus with above constitution, by the additional value and augend being suitably and respectively set, pixel data for one line of an image can be skipped with predetermined intervals. Therefore, when recording a reduced image or an image with low resolution on a recording medium an image with more preferable image quality can be obtained.

Apart from constituting the reduction devices with addition devices described above, the reduction devices can be constituted with counters. The data reduction rate setting device of the image reading apparatus may be able to set the data reduction rate to m/R (both m and R are natural number, and m<R). The reduction devices respectively comprise execution determination devices and skip setting devices.

The counter counts 0 to (R−1) in loop every time the pixel data are loaded from the conversion device. The execution determination device determines whether or not the value of the counter is equivalent to a predetermined value for skip execution. When the count value is determined to be the skip execution value, the skip setting device skips corresponding pixel data, and prevents skipped data from being outputted to the writing device. For the skip execution value, one or more values are set so that the count value reaches the skip execution value in every predetermined interval.

By setting skip execution value according to data reduction rate, when the count value reaches the execution value, corresponding pixel data are skipped. Therefore, The execution determination can be made with relatively easy constitution, and this easy constitution allows simplifying the structure of the entire apparatus.

In this case, depending on setting of initial value of the counter of each reduction device, it is probable that skipping intervals between pixel data of adjacent line sensors become different from the above-described predetermined intervals.

For this issue, each reduction device many comprise a counter initial value setting device that sets initial value of the counter. This counter initial, value setting device sets predetermined value in 0 to (R−1) as the initial value of the counter for the reduction process device corresponding to the first line sensor amongst all the line sensors one-dimensionally aligned in the main scanning direction. The counter initial value setting device furthermore sets residue of division result with following formula (2) in the reduction device as the initial value of the counter in the reduction device corresponding to next line sensor.

$$(k+c)/R \quad (2)$$

In the above formula, k represents the number of valid pixel to output only valid pixel data from light receivers constituting the line sensor corresponding to the reduction device, and c represents the initial value of the counter set in the reduction device.

Based upon following notion, the above formula (2) is extracted: if count value after reduction process (increment in the counter) for the last pixel data in the line sensor is known, the incremented counter value can be set as the initial value of the counter corresponding to next line sensor disposed in the main scanning direction.

In the image reading apparatus with above-described constitution, initial values of counters are suitably and respectively set, and pixel data for one line of an image can be skipped with predetermined intervals. Therefore, when reduced image or an image with low resolution is recorded on a recording medium, it is possible to obtain an image with more preferable image quality.

BRIEF DESCRIPTION OF THE DRAWINGS

The invention will now be described below, by way of example, with reference to the accompanying drawings.

FIGS. 9A to 9C are tables showing processes of additions conducted by an adder of the embodiment every time pixel data are loaded;

FIG. 10 is a block diagram schematically showing an internal structure of a reduction process unit of a second embodiment of the present invention;

FIGS. 12A to 12C are tables showing processes of change in count values every time pixel data are loaded.

DETAILED DESCRIPTION OF THE PREFERRED EMBODIMENT

First Embodiment

Figure 1:
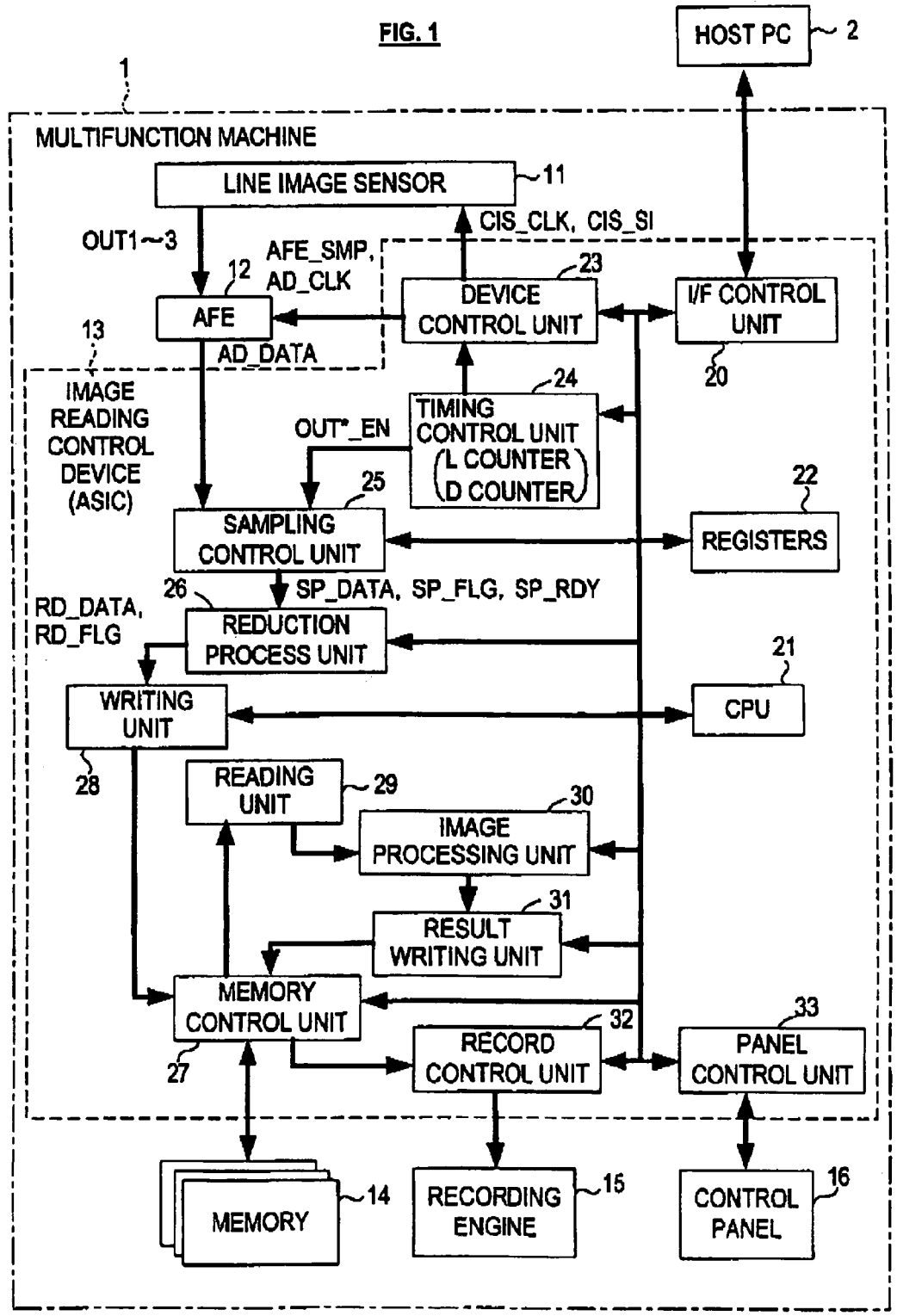
FIG. 1 is a block diagram showing a schematic internal structure of a multifunction machine of a first embodiment of the present invention.

Referring to FIG. 1, a multifunction machine 1 of the present embodiment has at least following functions: one is a function as an image reading apparatus that reads out an image of an original with a line image sensor 11; and another is a function as a printer, that records the readout image or image data transmitted from a host computer (to be referred to as host PC) 2 on a recording medium such as a recording paper with a recording engine 15.

As shown in FIG. 1, the multifunction machine 1 of the present embodiment comprises: a line image sensor (CIS) 11 that reads out an image of an original; an analog front end (AFE) 12 that converts pixel signals of each pixel obtained from the line image sensor 11 into pixel data as digital data; an image reading control device 13 that conducts various processes for the pixel data from AFE 12; a memory 14 that temporally stores the pixel data gone through various processes conducted by the image reading control device 13; a recording engine 15 that records based on the pixel data gone through processes by the image reading control device 13 onto a recording medium; and a control panel 16 for a user to externally conduct various settings of the multifunction machine 1, such as setting for a size of a recording medium or data reduction rate to be described hereinafter.

In the multifunction machine 1 with above described constitution, an image of an original is read out with the line image sensor 11. When an image is read out, pixel signals outputted from each channel (ch1, ch2, and ch3 in the present embodiment) of the line image sensor 11 are inputted into AFE 12. That is, pixel signals OUT1, OUT2 and OUT3 from read devices 6, 7, and 8 (shown in FIGS. 2 and 4, to be described in detail hereinafter) of respective channels constituting the line image sensor 11 are inputted into AFE 12.

AFE 12 comprises a multiplexer and a analog-digital converter inside. AFE 12 sequentially inputs pixel signals of each channel obtained from the line image sensor 11 into the analog-digital converter in a predetermined pattern to digitalize the signals into pixel data. Subsequently, the pixel data (AD_DATA) are inputted from AFE 12 into a sampling control unit 26 provided inside of the image reading control device 13 in a serial data sequence in a predetermined pattern corresponding to an operation of the multiplexer.

The image reading control device 13 is constituted as ASIC (Application Specific Integrated Circuit), and comprises the above-mentioned sampling control unit 25, CPU 21 that integrally controls the multifunction machine 1, registers 22, an I/F control unit 20, a device control unit 23, a timing control unit 24, a reduction process unit 26, a memory control unit 27, a writing unit 28, a reading unit 29, an image processing unit 30, a result writing unit 81, a record control unit 32, and a panel control unit 33 all installed therein.

Figure 2A:
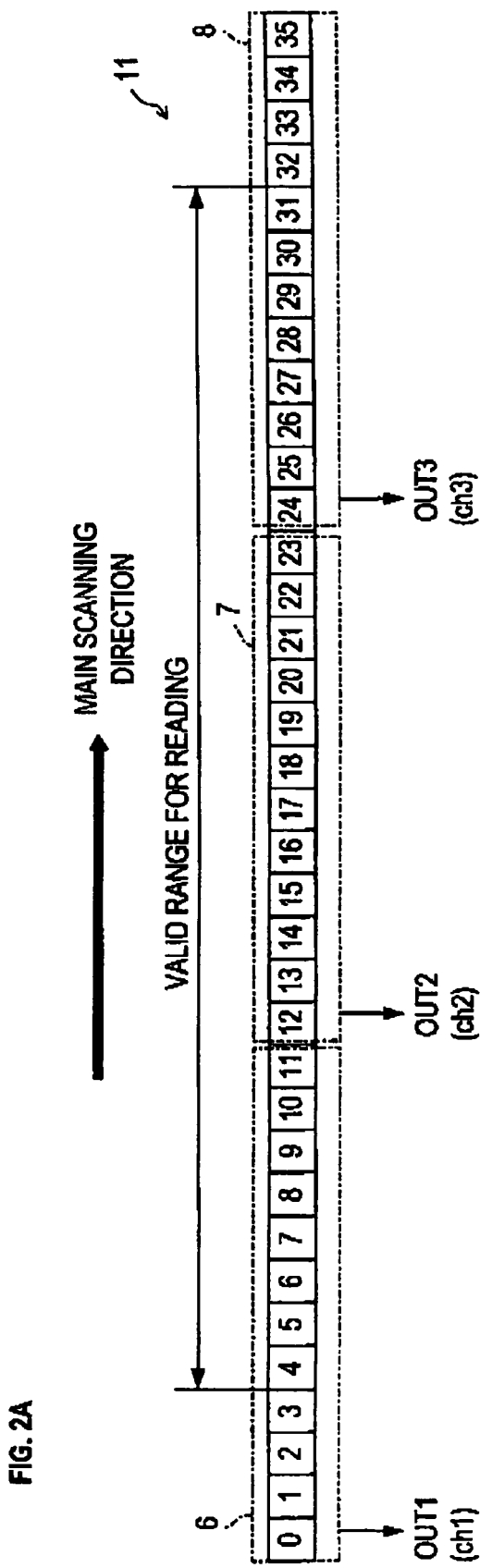
FIG. 2A is an explanatory view showing a valid range for reading.

As shown in FIG. 2A, the line image sensor 21 comprises a ch1 read device 6, a ch2 read device 7 and a ch3 read device. The read devices 6, 7 and 8 respectively comprise a plurality of light receivers (twelve light receivers in the present embodiment for simplifying description). Pixel signals from certain light receivers disposed, on both ends of the line image sensor 11, specifically pixel signals from four light receivers 0 to 3 in the ch1 read device 6 and four light receivers 32 to 35 in the ch3 read device 8, are outputted from the light receivers to be converted into pixel data. However, these pixel data are processed as invalid data by the sampling control unit 25. Pixel signals from other, light receivers, specifically the light receivers 4 to 31 shown in a range of "valid range for reading" in FIG. 2A, are processed as valid pixel data (SP_DATA) in the sampling control unit 25, and outputted into the reduction process unit 26.

Figure 2B:
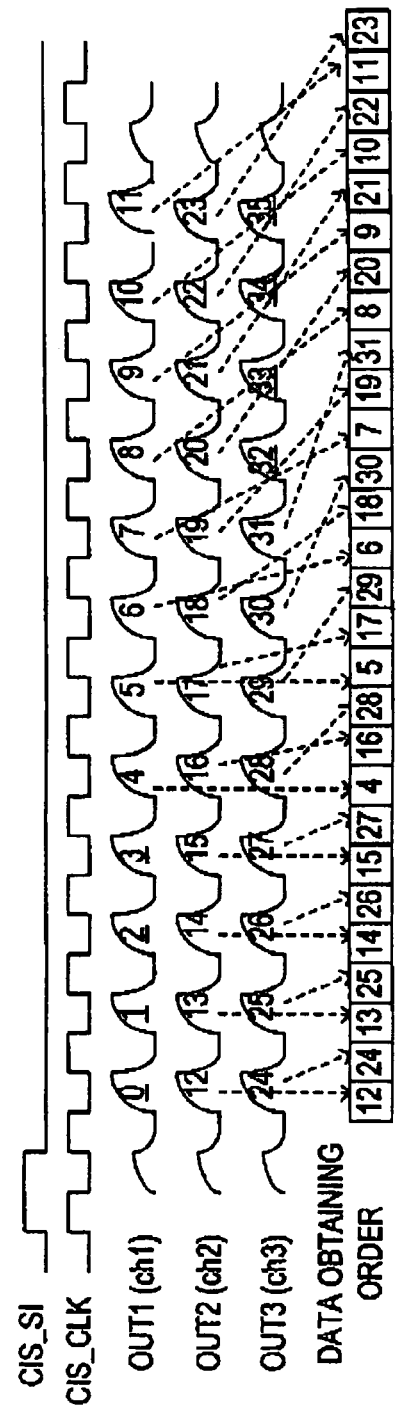
FIG. 2B is a time chart showing output of pixel signals from reading devices for respective channels, both for describing valid pixel in an line image sensor of the embodiment.

More specifically, as shown in FIG. 2B, By start signals (CIS_SI) outputted from the device control unit 23 to the line image sensor 11, operation of the line image sensor 11 is initiated. Based on reading reference clock (CIS_CLK) also outputted from the device control unit 23 to the line image sensor 11, read devices 6, 7 and 8 of the respective channel output pixel signals OUT1 to OUT3 in an alignment of a main scanning direction. Subsequently, pixel data (SP_DATA) are outputted from the sampling control unit 25 (that is, sequentially inputted into the reduction process unit 26) without invalid pixel data from the light receiver 0 to 3 in ch1 and the light receiver 32 to 35 in ch3, as described above.

Figure 4:
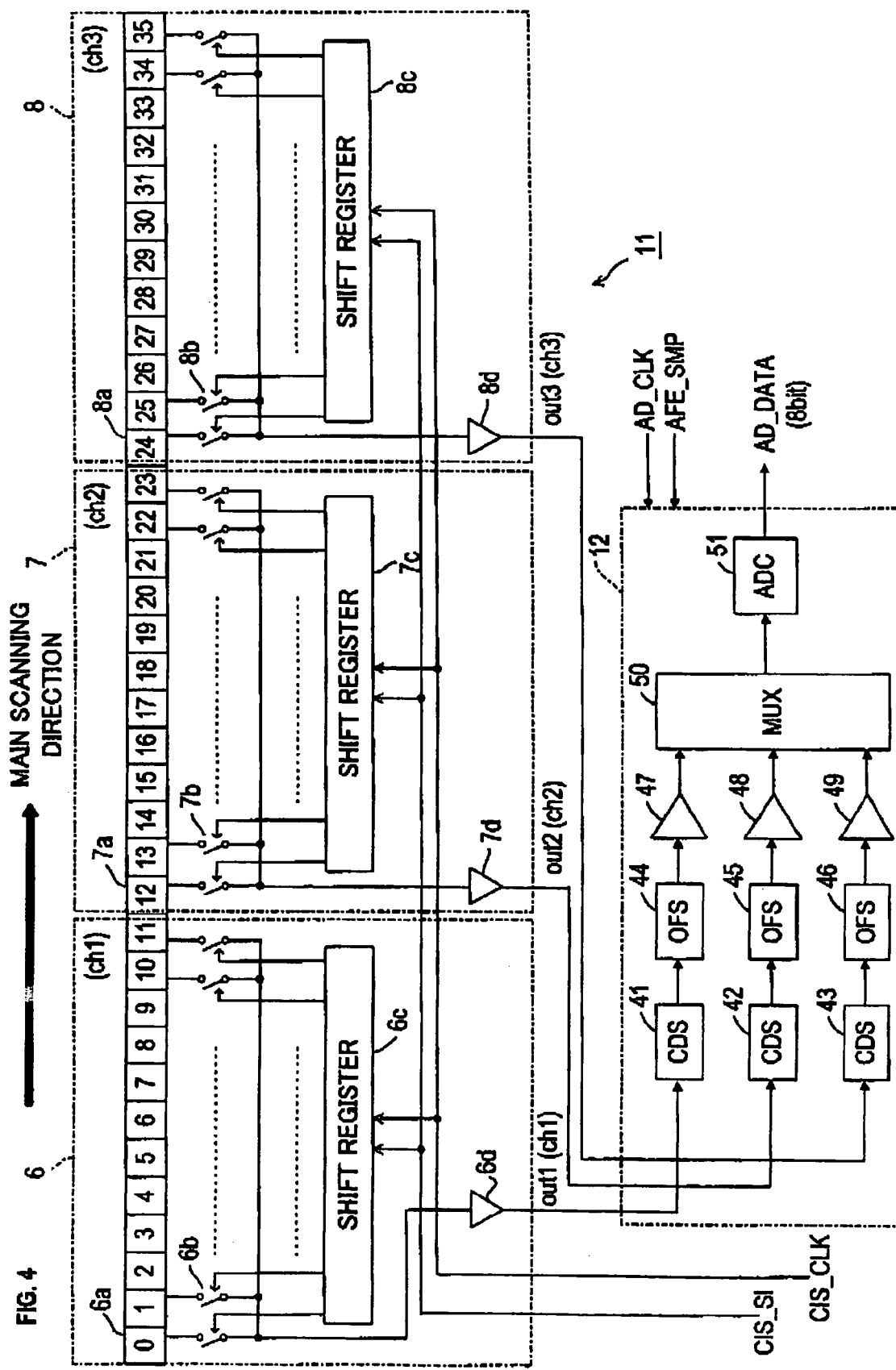
FIG. 4 is a schematic diagram showing structures of the line image sensor and AFE of the embodiment.

The line image sensor 11 is constituted as detailedly shown in FIG. 4. FIG. 4 is a schematic diagram showing structures of the line image sensor 11 and AFE 12. As shown therein, the ch1 read device 6 comprises: a line sensor 6a having twelve light receivers 0 to 11 one-dimensionally disposed in an alignment of a main scanning direction; switches 6b respectively provided between each light receiver and a buffer amplifier 6d; and a shift register 6c that sequentially turns on the switches 6b in the sequence of alignment in the main scanning direction. Each switch 6b is constituted specifically with semiconductor switching elements, such as MOS transistors.

In the shift register 6c, start signals (CIS_SI) and reading reference clock (CIS_CLK) both shown in FIG. 2B are inputted. Based on the reading reference clock (CIS_CLK), signals to sequentially turn on the switches 6b in the sequence of alignment in the main scanning direction are outputted. That is, one of the switches 6b corresponding to the first light receiver 0 is turned on, and pixel signals from the light receiver 0 are inputted into AFE 12 via the buffer amplifier 6d. Then, one of the switches 6b corresponding to next light receiver 1 is turned on, and pixel signals from the light receiver 1 are inputted into AFE 12 via the buffer amplifier 6d. This process is repeated sequentially until a switch 6b corresponding to the last light receiver 11 is turned on.

In the same manner as the ch1 read device 6, the ch2 read device 7 comprises: a line sensor 7a having twelve light receivers 12 to 28 one-dimensionally disposed in the sequence of alignment in the main scanning direction; switches 7b respectively provided between each light receiver and a buffer amplifier 7d; and a shift register 7c to sequentially turn on the switches 7b in the sequence of alignment in the main scanning direction. Correspondingly, the ch3 read device 8 comprises: a line sensor 8a having twelve light receivers 24 to 35 one-dimensionally disposed in the sequence of alignment in the main scanning direction; switches 8b respectively provided between each light receiver and a buffer amplifier 8d; and a shift register 8c to sequentially turn on the switches 8b in the sequence of alignment in the main scanning direction.

The switches 7b and 8b of the ch2 read device 7 and the ch3 read device 8 are also constituted with semiconductor switching elements. Operations of the ch2 read device 7 and the ch3 read device 8 are exactly the same as the operation of the ch1 read device 6. Therefore, description thereof is skipped here.

AFE 12 comprises correlation double, sampling circuits (CDS) 41 to 43, offset adjustment circuits 44 to 46, amplifiers 47 to 49, a multiplexer (MUX) 50, and an analog-digital converter (ADC) 51. APE 12 is constituted to be corresponsive to three channels ch1 to ch3. The above-mentioned CDS 41 to 43, OPS 44 to 46 and amplifiers 47 to 49 are respectively provided in each channel.

Pixel signals OUT1 from the ch1 read device 6 constituting the line image sensor 11 are inputted into MUX 50 via CDS 41, OFS 44 and amplifier 47 all corresponding to ch1. In the same manner, pixel signals OUT2 from the ch2 read device 7 are inputted into MUX 50 via CDS 42, OFS 45 and amplifier 48 all corresponding to ch2. Furthermore, pixel signals OUT3 are inputted into MUX 50 via CDS 43. OFS 46 and amplifier 49 all corresponding to ch3.

Generally, CDS 41 to 43 have function to remove noise elements by sampling pixel signals from an image sensor in CCD method twice with some interval between each sampling. However, in the present embodiment, an AFE register (not shown) is used to operate CDS as a simple sample-and-hold circuit. Consequently, an analog level is taken at predetermined timing of pixel signals outputted from the line image sensor 11, and this level is maintained until A/D conversion is conducted.

OFS 44 to 46 are constituted to put offset voltage on respective input signals from ch1 to ch3. The amplifiers 47 and 49 are known along amplifiers wherein gain from the input signals can be adjusted. Gain in the respective amplifiers 47 to 49 are set in gain registers (not shown). By changing set values, gain can be voluntarily set.

MUX 50 comprises three input channels and one output channel. The respective input channels are connected to output terminals of corresponding amplifiers 47 to 49, and the output channel is connected to the ADC 51. This MUX 50 is constituted to select an of input signals from amplifiers 47 to 49 in some pattern according to set values in the unshown registers (ch1, ch2 and then ch3, in the present embodiment), and to sequentially input selected signals into ADC 51.

It is to be noted that pixel signals OUT 1 to OUT3 of each channel are taken into CDS 41 to 43 based on sampling clock (AFE_SMP), and that conversion thereof into pixel data in ADC 51 is conducted based on conversion reference clock (AD_CLK).

Referring now to FIG. 1 again, constitution of the multifunction machine 1 is described below. I/F control unit 20 is an interface that control transmission/reception of various data to/from the external host PC 2. In the registers 22, various parameters necessary for operation of the multifunction machine 1 are set mainly by CPU 21. The timing control unit 24 outputs timing signals that can be a reference to operation of the multifunction machine 1 to the device control unit 23. Furthermore, the timing control unit 24 comprise a L counter and a D counter therein, and outputs valid range designating signals (OUT1_EN, OUT2_EN and OUT3_EN) for each channel to take only valid pixel data and channel designating signals to specify a channel for the sampling control unit 25 to take pixel data therefrom. These designating signals are outputted to the sampling control unit 25 based on count values of respective counters described above.

The device control unit 23 controls the line image sensor 11 and AFE 12 by generating and outputting the above-described start signals (CIS_SI), reading reference clock (CIS_CLK), sampling clock (AFE_SMP) and conversion reference clock (AD_CLK), based on timing signals from the timing control unit 24.

Amongst pixel data sequentially outputted from AFE 12, the sampling control unit 25 outputs pixel data (SP_DATA) corresponding to valid pixel signals to the reduction process unit 26 based on the valid range designating signals (OUT1_EN to OUT3_EN) and ch designating signals (count value of the D counter to be described hereinafter) along with channel flag (SP_FLG) that indicates the channel of the pixel data. Additionally, the sampling control unit 25 outputs pixel data output signals (SP_RDY) that indicates pixel data and channel flag have been outputted to the reduction process unit 26.

Figure 3:
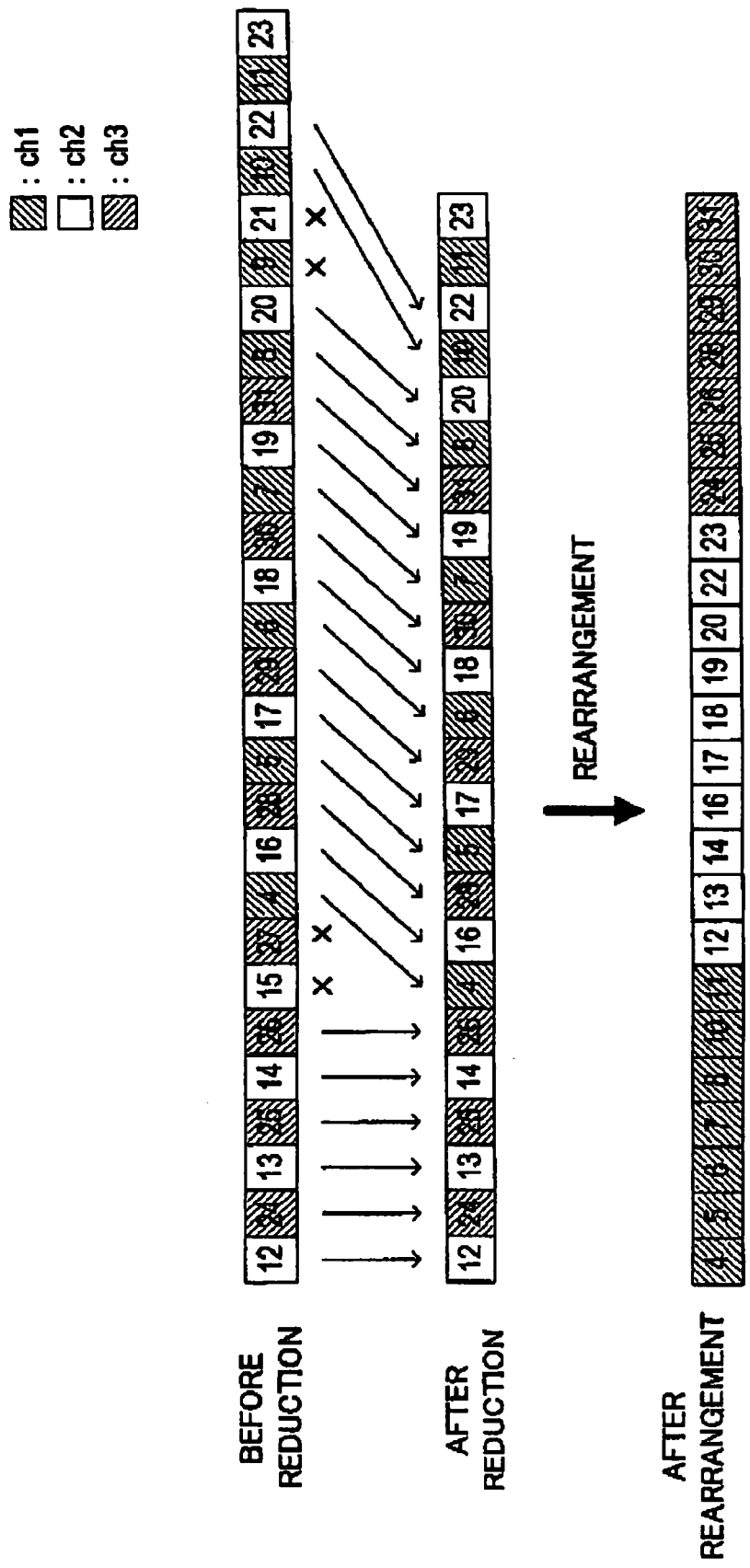
FIG. 3 is an explanatory view showing general description of reduction process and rearrangement of pixel data subsequent to the reduction process of the embodiment.

The reduction process unit 26 conducts a reduction process to the valid pixel data inputted from the sampling control unit 25 based on rate of data reduction set by a user with input operation from the operation panel 16. Subsequently, the reduction process unit 26 outputs the processed pixel data (RD_DATA). The reduction process is conducted as schematically shown in FIG. 3. The detail thereof will be described later. In the description below, pixel data respectively corresponding to thirty six light receivers (0 to 35) constituting the line image sensor 11 are referred to as pixel data D0 to D35.

As shown in the bottom part of FIG. 2B, into the reduction process unit 26, pixel data corresponding to the valid pixel signals of each channel are sequentially inputted from D12 (ch2) to D23 (ch2). It is already explained that pixel data D0 to D3 and D 32 to D35 are not inputted as they are determined to be invalid pixel data. Respective pixel data of each channel inputted as above are skipped with predetermined intervals in between.

In the present embodiment, the data reduction rate is set 5/6 which corresponds with the reduction rate when an original in B4 size is read and recorded on a recording medium in A4 size. Consequently, every sixth pixel data inputted from each channel are skipped. However, first skipping timings for ch2 and ch3 are set to predetermined timings (in the present embodiment, respectively fourth pixel data: D15 and D27) by a setting method to be described later, so that skipping intervals are maintained to be constant even when pixel data from respective channels are rearranged into the alignment order in the main scanning direction.

Accordingly, in ch1, the sixth pixel data D9 is skipped. In ch2, D15 is firstly skipped and then, next sixth pixel data D21 is skipped. Next sixth pixel data from D21 in ch2 does not exist in the present embodiment. In ch3, D 27 is skipped. Next sixth pixel data from D27 in ch3 does not exist in the present embodiment. Consequently, in the present embodiment, four pixel data D9, D15, D21 and D27 are skipped amongst obtained pixel data. Other pixel data (RD_DATA) are outputted from the reduction process unit 26 to the writing unit 28 as a result of the reduction process.

The outputted pixel data are rearranged in the sequence of alignment in the main scanning direction by the writing unit 28, and written in the memory 14. Alternatively, after being written into the memory 14 in au original arrangement the outputted pixel data are rearranged by the reading unit 29 when reread thereby. In other words, the writing unit 28 controls a writing address when pixel data from the reduction process unit 26 are written into the memory 14, and the reading unit 29 control a reading address when pixel data written in the memory 14 are read out.

It should be noted that the rate of data reduction referred herein is not limited to the reduction rate for recording reduced image of a read original, but rate of resolution reduction for reducing resolution of a read image and recording thereof, for example, is also included. This data reduction rate can be fixed in advance, or the rate can be voluntarily set by a user.

The image process unit 30 conducts various image processes for the pixel data read out by the reading unit 29 such as brightness correction, shading correction, y correction, MTF correction, binary process and so on. Data after going through these image processes are written into the memory 14 by the result writing unit 31.

The memory control unit 27 relays data writing/reading between the memory 14 and the following units: the writing unit 28, reading unit 29, result writing unit 31 and the record control unit 32. While conducting an adjustment with the memory 14, the memory control unit 27 controls reading/writing data based on a specified address.

The record control unit 32 reads out image processed data written into the memory 14 by the result writing unit 31 corresponding to a command from the operation panel or the host PC 2, and outputs the data to the recording engine 15. The panel control unit 33 transmits content of operation (input) by a user from the operation panel to CPU 21, and controls the operation panel 16 to indicate operation state of the multifunction machine 1.

Figure 5:
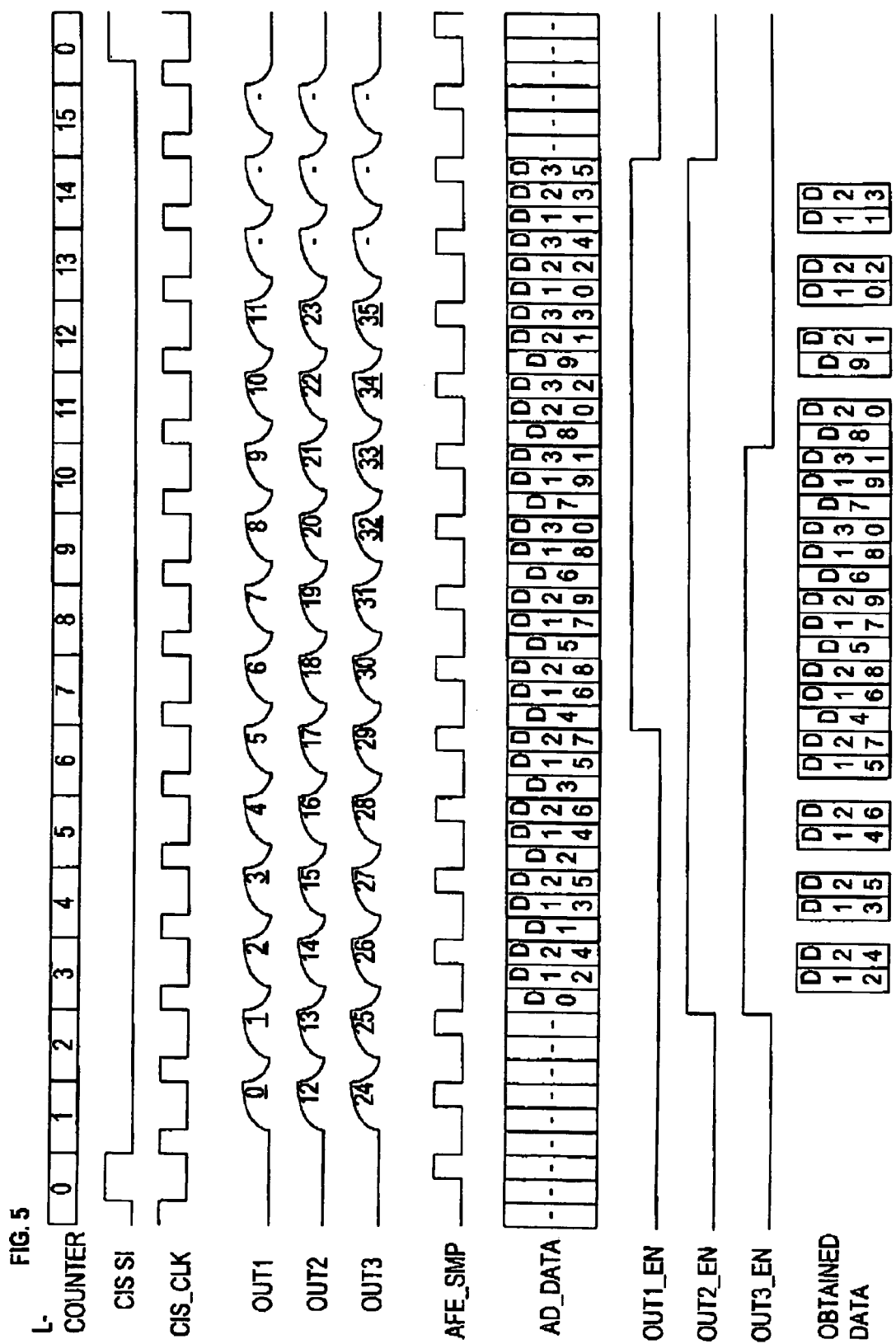
FIG. 5 is a time chart describing operation of the multifunction machine of the embodiment from a step of image reading by the line image sensor to a step of outputting valid pixel data conducted by a sampling control unit.
Figure 6:
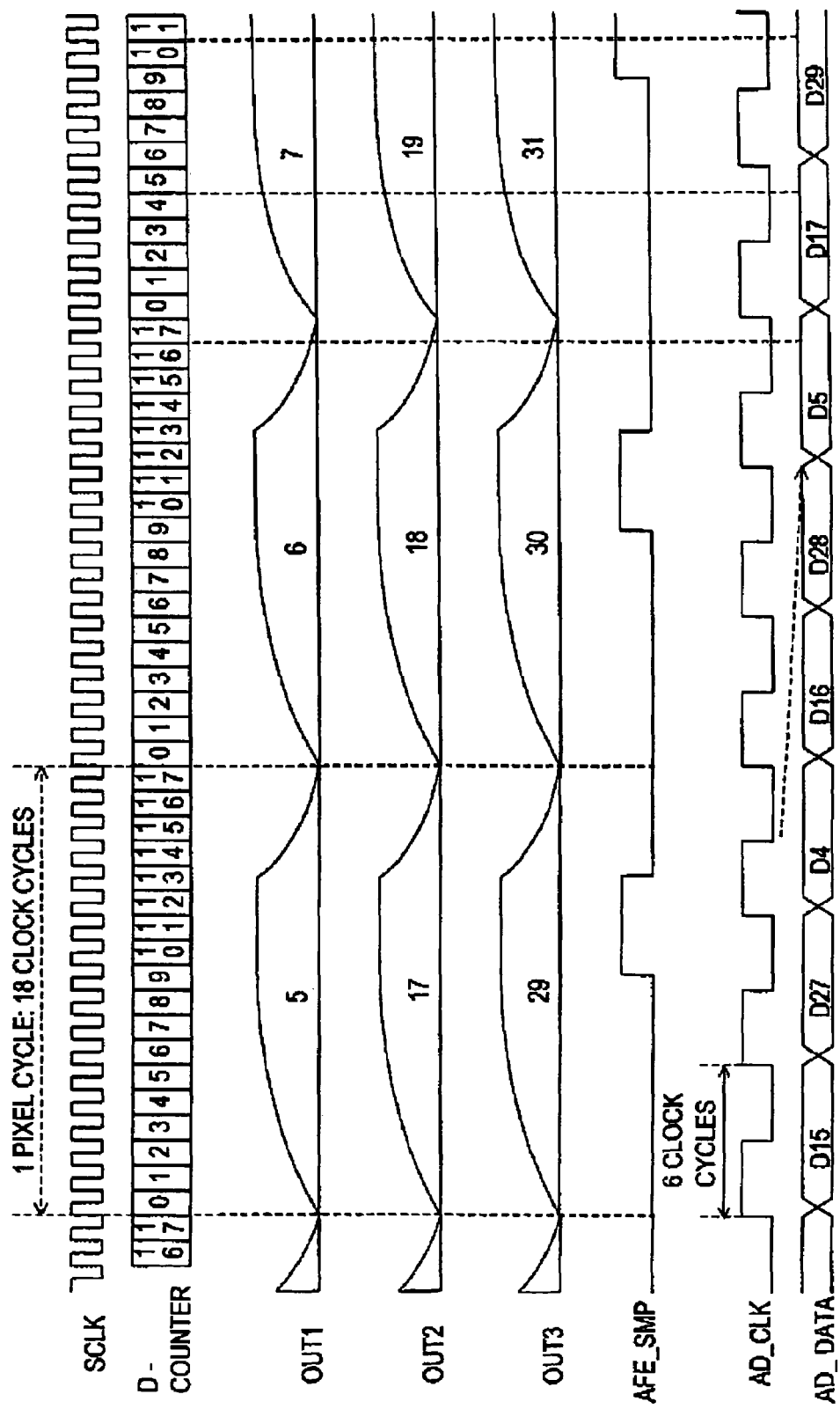
FIG. 6 is a time chart more detailedly describing analog-digital conversion shown in the time chart in FIG. 5.

Now referring to the time charts in FIGS. 5 and 6, the following describes image reading operation by the line image sensor 11 and output operation of the sampling control unit 25 to output only valid pixel data in the multifunction machine 1 with the above constitution.

As described above with reference to FIG. 2B, by an input of start signals (CIS_SI), reading operation is initiated. Every time reading reference clock (CIS_CLK) is inputted, respective pixel signals OUT1, OUT2 and OUT3 from the line image sensor 11 are taken in the CDS 41 to 43 in AFE 12. In the present embodiment, pixel signals from the first light receivers (0, 12 and 24) of the respective channels ch1 to ch3 are taken in AFE 12 at timing of first trailing edge of reading reference clock (CIS_CLK) after a trailing edge of the start signals (CIS_SI).

Pixel signals respectively taken in AFE 12 are sampled in CDS 41 to 43 based on sampling clock (AFE_SMP). After predetermined period passes since the sampling is over, the pixel signals are sequentially converted into pixel data, (AD_DATA) D0, D12 and D24 by the analog-digital converter 51 and outputted. From then onward, every timing of trailing edge of reading reference clock (CIS_CLK), pixel signals from each channel are sequentially inputted into AFE 12 in the sequence of alignment in the main scanning direction of the light receivers. Subsequently, pixel signals are sampled based on sampling clock (AFE_SMP), and converted into pixel data (AD_DATA) by the analog-digital converter 51 to be outputted.

Conversion into pixel data conducted by the analog-digital converter 51 is more detailedly described in FIG. 6. In FIG. 6, a period wherein pixel data (AD_DATA) from D15 to D29 are outputted is abstracted form the time chart in FIG. 5 and shown therein. As shown in the drawing, eighteen cycles of system reference clock (SCLK) of the multifunction machine 1 consist a period to take one pixel signal in each channel (one pixel cycle).

In order to conduct A/D conversion with each pixel signal of each channel in one pixel cycle, that is, in order to conduct A/D conversion with pixel signals in three channels (in the present embodiment) within eighteen cycles of system reference clock for output, the device control unit 23 generates conversion reference clock (AD_CLK) having a cycle consisted with six cycles of system reference clock, and outputs conversion reference clock (AD_CLK) to AFE 12.

After taking pixel signals from each channel initiated by sampling clock (AFE_SMP), output of pixel data from AFE 12 is initiated at timing when edge of sampling clock (AFE_SMP) falls with delay for two and a half cycle of conversion reference clock (AD_CLK). For example, after being sampled initiated by sampling clock (AFE_SMP), pixel signals from the sixth light receiver (5) in the ch1 reading device 6 are converted into pixel data D5 at the falling timing of sampling clock (AFE_SMP) with delay for two and a half cycles of conversion reference clock (AD_CLK). Subsequent to obtaining D5, pixel data D17 and D 29 respectively from ch2 and ch3 can be sequentially obtained at every cycle of conversion reference clock (AD_CLK).

Timing when the sampling control unit 25 takes respectively converted pixel data (AD_DATA) is based on count value of the D counter of the timing control unit 24. This D counter repeats counting from 0 to 17 in every pixel cycle at the cycle of system reference clock (SCLK). The D counter is a counter for determining timing for the sampling control unit 25 to take pixel data (AD_DATA) from AFE 12. In the present embodiment, when the count value of this D counter is 17, the sampling control unit 25 is set to take pixel data from ch1; when the count value is 5, the sampling control unit 25 is set to take pixel data from ch2; and when the count value is 11, the sampling control unit 25 is set to take pixel data from ch3.

Thereby, pixel data D5 from ch1, for example, are taken by the sampling control unit 25 when the count value of the D counter becomes 17. Pixel data D17 from ch2 are taken by the sampling control unit 25 when the count value of the D counter becomes 5. Pixel data D29 from ch3 are taken by the sampling control unit 25 when the count value of the D counter becomes 11.

Meanwhile, the sampling control unit 25 does not take pixel data corresponding to invalid pixel signals as described above. This operation is conducted based on valid range designating signals OUT1_EN, OUT2_EN and OUT3_EN outputted from the timing control unit 24 based on count value of the L counter of the timing control unit 24.

As shown in FIG. 5, the L counter counts up from 0 to 15 in every one pixel cycle. The level of valid range designating signals (OUT1_EN) corresponding to ch1 becomes high when the count value of the L counter becomes 7, and becomes low when the count value becomes 15. These valid range designating signals (OUT1_EN) are outputted from the timing control unit 24 to the sampling control unit 25. The sampling control unit 25 takes pixel data corresponding to ch1 only while the level of the valid range designating signals (OUT1_EN) is high, Therefore, pixel data D0 to D3 inputted while the level of the valid range designating signals (OUT1_EN) is low are not taken.

The level of valid range designating signals (OUT2_EN) corresponding to ch2 becomes high when the count value of the L counter is between 3 and 15. Thereby, all the pixel data corresponding to ch2 are taken. The level of valid range designating signals (OUT3_EN) corresponding to ch3 becomes high when the count value of the L counter is between 3 and 11. Thereby, pixel data D32 to D35 inputted while the level of the valid range designating signals is low are not taken.

The sampling control unit 25 outputs obtained valid pixel data (SP_DATA) to the reduction process unit 26. Simultaneously, the sampling control unit 25 also outputs channel flag (SP_FLG) and pixel data output signals (SP_RDY) to the reduction process unit 26.

Figure 7:
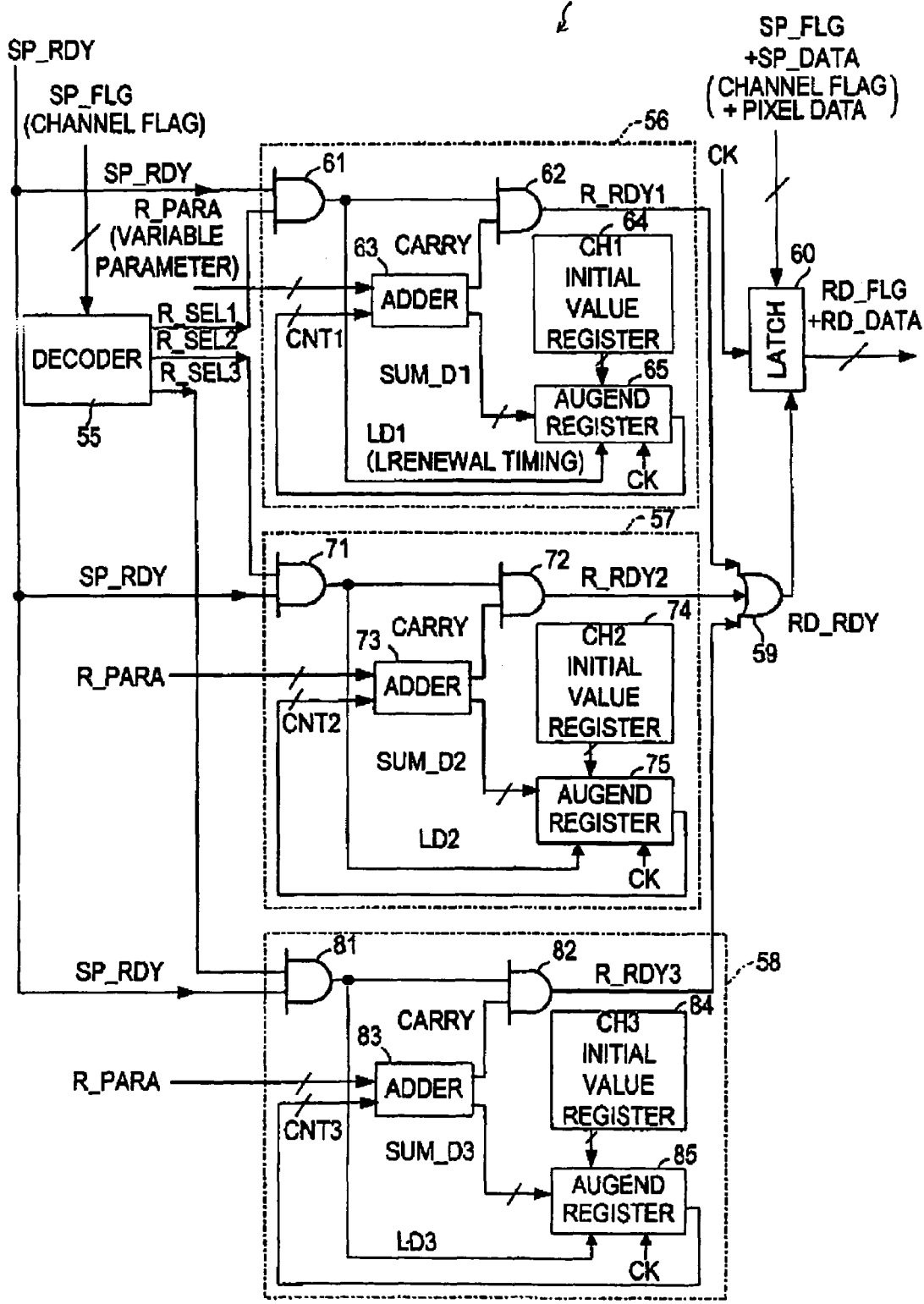
FIG. 7 is a block diagram showing schematic internal structure of a reduction process unit of the first embodiment.

Now referring to FIGS. 7 and 8, specific structure and operation of the reduction process unit 26 will be described. As shown in FIG. 7, the reduction process unit 26 comprises: a decoder 55; reduction process circuits 56 to 58 corresponding to each channel (ch1 reduction process circuit 56, ch2 reduction process circuit 57 and ch3 reduction process circuit 58); OR circuit that conducts logical addition with outputted signals from respective reduction process circuits 56 to 58; and a latch 60.

The decoder 55 decodes channel flag (SP_FLG), and outputs select signals (R_SEL) to one of the above-described reduction process circuits 56 to 58 corresponding to a channel selected in a result of decoding. For example, as shown in FIG. 8, when pixel data D4 from ch1 are inputted the decoder 55 raises level of select signals. (R_SEL1) to a high level for the ch1 reduction process circuit 56 corresponding to ch1, based on channel flag (SP_FLG) indicating ch1 inputted together with the pixel data D4.

For another example, when pixel data D16 from ch2 are inputted, the decoder 55 raises level of select signals (R_SEL2) to a high level for the ch2 reduction process circuit 57 corresponding to ch2, based on channel flag (SP_FLG) indicating ch2 inputted with the pixel data D16. Furthermore, when pixel data D28 from ch3 are inputted, the decoder 55 raises level of select signals (R_SEL3) to a high level for the ch3 reduction process circuit 58 corresponding to ch3, based on channel flag (SP_FLG) indicating ch3 inputted with the pixel data D28.

The following describes the reduction process circuits 56 to 58. Constitutions of respective reduction process circuits 56 to 58 are the same with one another. Thus, only the constitution of the ch1 reduction process circuit 56 will be described to represent others. The ch1 reduction process circuit 56 comprises AND circuit 61 that conducts logical multiplication with pixel data output signals (SP_RDY) and select signal (R_SEL1); a 9-bit adder 63 that conducts addition with 8-bit variable parameter (R_PARA) and 8-bit augend CNT1 (specifically 1 is furthermore added as to be described hereinafter); a ch1 initial value register 64 wherein an initial value of the augend CNT1 in the adder 63 are set therein; an augend register 65 that sets setting value of the ch1 initial value register 64 when level of renewal timing LD1 which is an output from the AND circuit 61 becomes high for the first time, and sets low 8 bits (SUM_D1) excluding a carry from a result of the addition conducted by the adder 63 every time the level of renewal timing LD1 becomes high after the first time; and a AND circuit 62 that conducts logical multiplication with an output from the AND circuit 61 and a carry bit obtained by the adder 63. The variable parameter (R_PARA) is set into the registers 22 by CPU 21 corresponding to rate of data reduction.

The ch1 reduction process circuit 56 constituted as above conducts addition with a value wherein "1" is added to variable parameter (R_PARA) and augend CNT1 every time pixel data (SP_DATA) corresponding to ch2 are taken. If a carry of the addition result is 1 (high level), level of an output from the AND circuit 62 (R_RDY1) becomes high. Thereby, level of an output from the OR circuit 59 (RD_RDY) becomes high. Consequently, pixel data (SP_DATA) from the sampling control unit 25 and channel flag (SP_FLG) are latched by the latch 60 without being skipped, and outputted as pixel data (RD_DATA) and channel flag (RD_FLG) to the writing unit 28. It should be noted that SP_DATA and RD_DATA, SP_FLG and RD_FLG are essentially the same, and that only the appellations thereof are changed.

As a result of addition conducted by the adder 63, if the carry is 0 (low level), the level of an output from the AND circuit 62 (R_RDY1) becomes low, and the level of an output from the OR circuit 59 (RD_RDY) also becomes low. Consequently, pixel data from the sampling control unit 25 (SP_DATA) are not latched by the latch 60, and therefore skipped.

To make description simple, the value wherein "1" is added to variable parameter (R_PARA) is represented as additional value B, and augend CNT1 is represented as augend A. In the adder 63, addition "A+B" is conducted. This value B is obtained from a formula (3) shown below corresponding to rate of data reduction.

$$B = (\text{rate of data reduction}) \cdot 2^n \tag{3}$$

Fractional part of an obtained value therefrom should be rounded off. "n" represents operation bits (in the present embodiment "8") of the adder 63.

Accordingly, ⅚ is multiplied (the rate of data reduction is set to ⅚ in the present embodiment) by 256, and 213 obtained therefrom becomes the augend B. A value obtained by subtracting 1 from the augend B becomes variable parameter (R_PARA). For initial value of augend A, any value in rage of 0 to $2^n-1$ (i.e. 0 to 255) can be voluntarily set. In the present embodiment, the maximum value "255" is set in the ch1 initial value register 64 so that carry can be generated only by adding "1" thereto.

Figure 8:
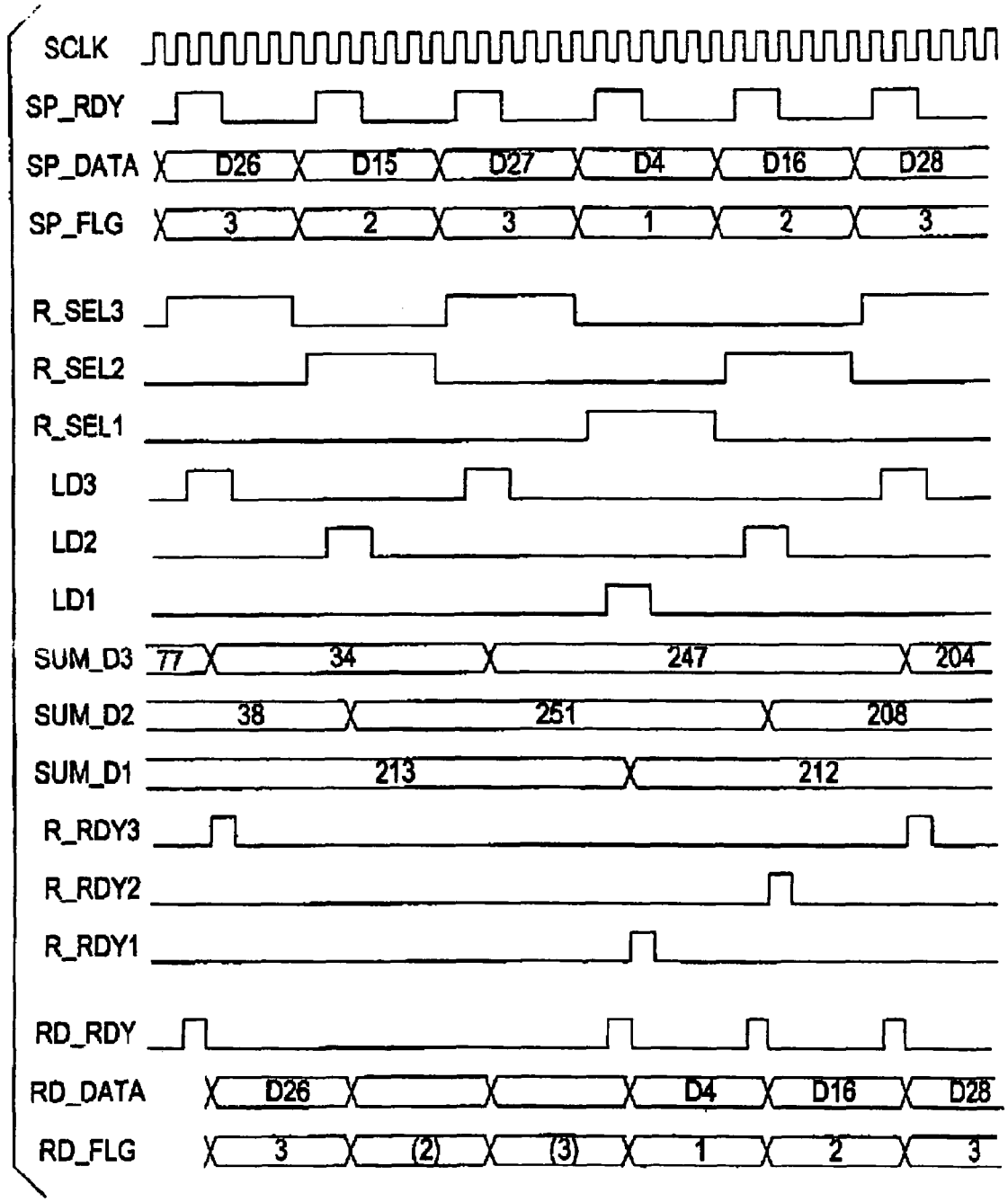
FIG. 8 is a time chart describing operation of the reduction process unit of the first embodiment.

When first valid pixel data of ch1, i.e. pixel data D4 inputted, as shown in FIG. 8, level of renewal timing LD1 becomes high. Consequently, the setting value of the ch1 initial value register, 64, i.e. augend initial value "255" is firstly set in the augend register 65. Subsequently, in the adder 63, above-described addition "A+B", i.e. "255+213" is conducted. As the result of this addition becomes "468", carry occurs, and the level of an output from the AND circuit 62 (R_RDY1) becomes high (FIG. 8). Thereby, inputted pixel data D4 and channel flag (RD_FLG) indicating that the data corresponds with ch1 are outputted to the writing unit 28.

Low 8 bits of the addition result (SUM_D1), i.e. "212" is set in the augend register 65 as augend CNT1 (augend A) when forthcoming pixel data corresponding to ch1 are inputted and the level of renewal timing LD1 becomes high again. That is, when pixel data corresponding to ch1 are inputted next time, renewed augend "212" and above-described augend B "213" are added.

Since augend A is not set in the augend-register 65 until valid pixel data D4 are inputted, SUM_D1 from the adder 63 remains "213" which is a value wherein 1 is added to variable parameter (R_PARA) (i.e. augend B), as shown in FIG. 8. Setting of initial value of augend A, and extraction and setting of augend B based on the above-described formula (3) are conducted by CPU 21.

As described above, in the ch1 reduction process circuit 56, addition by the adder 63 is repeated every time pixel data corresponding to ch1 are inputted. Calculation process for ch1 is as shown in FIG. 9A. As pixel data D4, D5, D6, D7 . . . are sequentially inputted, the addition result becomes 468, 425, 382, 339 . . . . When 6$^{th}$ pixel data D9 are taken, the addition result becomes 253, and carry bit does not occur. Consequently, the pixel data D9 are skipped. As a result, in ch1, pixel data D4 to D8, D10 and D11 are outputted to the writing unit 28 without being skipped.

Constitutions and operations of the ch2 reduction process circuit 57 and the ch8 reduction process circuit 58 are the same as those of the ch1 reduction process circuit 56, and addition by the adders 73 and 83 are respectively conducted every time corresponding pixel data are taken. Therefore, detailed description thereof is skipped here. However, setting initial value of augend set in the ch2 initial value register 74, and setting initial value of augend set in the ch3 initial value register 84 are significantly different from the setting for ch1. Thus, setting methods of respective initial values of augends will be described below.

If the initial value of augend of ch2 and initial value of augend of ch3 are voluntarily set in the same manner as in case of ch1, skip interval becomes irregular between adjacent line sensors (adjacent channels) when all pixel data after reduction process for one line are aligned in the alignment order in the main scanning direction, and singularity might be created in an image.

In the present embodiment, setting values for the ch2 initial value register 74 for ch2 and the ch3 initial value register 84 are determined so that skipping can be conducted with predetermined intervals (every sixth pixel, in the present embodiment) when all pixel data after reduction process for one line of an image are aligned in the alignment order in the main scanning direction.

Specifically, residue of division by the following formula (4) is set as an initial value of augend corresponding to adjacent channel.

$$\{B\cdot(\text{number of valid pixel})+(\text{initial value of augend})\}/2^n \quad (4)$$

Applying this formula to the case of ch1, initial value of augend for ch2 will be obtained below. In ch1, the number of valid pixel is "8", initial value of augend is "255", and thus $2^n$=256. Assigning these values into the above formula (4), the calculation becomes (213×8+255)/256, and residue "167" is obtained. As shown in FIG. 9A, this residue "167" is the low 8 bits of the addition result when the last pixel data D11 in ch1 are taken.

As shown in FIG. 9B, this "167" is set as the initial value of augend for ch2 which is adjacent channel next to ch1. Subsequently, when the first pixel data D12 in ch2 are taken, the initial value of augend "167" and the addition value B "213" are added by the adder 73. The result thereof becomes "380", and a carry bit occurs. Consequently, pixel data D12 are outputted to the writing unit 28 without being skipped. The low 8 bits of the addition result "124" becomes the augend A when pixel data from ch2 are taken next time.

Accordingly, in the ch2 reduction process circuit 57, addition operation by the adder 73 is repeated every time pixel data corresponding to ch2 are inputted. Subsequently, the calculation process for ch2 becomes as shown in FIG. 9B. As pixel data D12, D13, D14, D15 . . . are sequentially inputted, the addition result becomes 380, 337, 294, 251 . . . . That is, a carry bit does not occur from the addition when D15 are inputted, and therefore D15 are to be skipped. Likewise, since a carry bit does not occur from the addition result when pixel data D21 are taken, D21 are to be skipped. Consequently, it is clear that every sixth pixel data are skipped.

Extraction of the initial value of augend for ch3, that is extraction of a value to be set in the ch3 initial value register 84 in the ch3 reduction process circuit 58 is conducted in the same manner as in the case of ch2. Specifically, applying the above-described formula (4) to the case of ch2, the initial value of augend of ch3 is obtained. In the case of ch2, the number of valid pixel is "12", the initial value of augend is "167". Assigning these values into the formula (4), the calculation becomes (213×12+167)/256, and "163" is obtained as residue. As shown in FIG. 9B, this residue "163" is the low 8 bits of addition result when the last pixel data D28 in ch2 are taken.

As FIG. 9C shows, this value "163" is set as the initial value of augend for ch3 which is the adjacent channel next to ch2. When the first pixel data D24 in ch3 are taken, the initial value of augend "163" and the addition value B "213" are added by the adder 83. The result of this addition becomes "376", and thus a carry bit occurs. The pixel data D24 are outputted to the writing unit 28 without being skipped. The low 8 bits of the addition result "120" becomes the augend A when pixel data from ch3 are taken next time.

Accordingly, in the ch3 reduction process circuit 58, addition conducted by the adder 83 is repeated every time pixel data corresponding to ch3 are inputted. Consequently, the calculation process for ch3 becomes as shown in FIG. 9C. As pixel data D24, D 25, D26, D27 . . . are sequentially inputted, the addition result becomes 376, 333, 290, 247. A carry bit does not occur from the addition when D27 are inputted. Thereby, D27 are to be skipped. Extraction of initial values of augends for ch2 and ch3 based on the formula (4) as described above is conducted by CPU 21.

Skipping of pixel data D15 from ch2 and D27 from ch3 is shown in FIG. 8. As shown therein, when D15 corresponding ch2 are inputted as pixel data (SP_DATA) from the sampling unit 25, the addition result in the adder 73 in the ch2 reduction process circuit 57 becomes "251". Since a carry bit does not occur therefrom, the level of an output of the AND circuit 72 (R_RDY2) remains low, and the level of an output from the OR circuit 59 (RD_RDY) also remains low. Thereby, pixel data D15 are skipped without being latched by the latch 60.

When D 27 corresponding to ch3 are inputted as pixel data (SP_DATA) from the sampling control unit 25, the addition result in the adder 83 in the ch3 reduction process circuit 58 becomes "247". Since a carry bit does not occur therefrom, the level of an output from the AND circuit 82 (R_RDY3) stays low, and the level of an output from the OR circuit 59 (RD_RDY) also stays low. Thereby, pixel data D27 are also skipped without being latched by the latch 60.

Pixel data after reduction process (skipping) (RD_DATA) inputted from the reduction process unit 26 to the writing unit 28 are sequentially written into the memory 14 by the memory control unit 27 according to an address to specify where the data are to be written set by the writing unit 28.

At the time of writing, either to write pixel data so that pixel data from each channel are rearranged in the sequence of alignment in the main scanning direction as one entire line, or to write pixel data in an original order and read the pixel data with the memory control unit 27 in the sequence of the alignment in the main scanning direction sequentially from ch1 (read and rearrange the pixel data at the time) can be determined voluntarily. In the first case, the writing unit 28 suitably controls writing addresses based on channel flags (RD_FLG) inputted with pixel data (RD_DATA). In the second case, reading unit 29 suitably controls reading addresses based on channel flags (RD_FLG) stored in the memory 14 with pixel data (RD_DATA).

As described above, in the multifunction machine 1 of the present embodiment, the reduction process unit 26 conducts the reduction process (i.e. skipping pixel data based on rate of data reduction), and pixel data after the reduction process are written in the memory 14. Thereby, the memory space necessary for one line becomes only as large as for result of reduction process in the main scanning direction. This constitution allows reduction in the memory space.

Therefore, even if, for example, the multifunction machine 1 is provided with the line image sensor capable of reading an original in B4 size but capable of recording for the A4 size in maximum, it is not necessary to write all pixel data in B4 size, and the memory 14 capable of writing pixel data in A4 size per line is sufficient.

Moreover, even if, for example, the multifunction machine 1 has the same maximum capacity both for reading and recording, when reduction process is conducted, only pixel data after the reduction process are written into the memory 14. Although the memory capacity for recording pixel data cannot be reduced, access amount to the memory 14 for data writing/reading can be reduced, and it is possible to make memory access faster by reducing necessary bus bandwidth.

Furthermore, in the reduction process in the reduction process unit 26, pixel data are skipped with specific intervals according to rate of data reduction. Thereby, when a reduced image or an image with low resolution is recorded on a recording medium, an image with preferable image quality can be obtained.

Still furthermore, in the reduction process unit 26 of the present embodiment, the reduction process circuits 56, 57 and 58 with an adder are provided for respective channels. Every time pixel data from corresponding channel are taken, predetermined addition is conducted, and skipping is conducted based on presence/absence of a carry bit. Thereby, the reduction process unit 26 can have relatively simple constitution, and thus the entire structure of the multifunction machine 1 can be simplified.

In addition, additional values B for respective adders 63, 73 and 83 of respective reduction process circuits 56, 57 and 58 are set according to data reduction rate, and initial value of augend in the ch2 reduction process circuit 57 and initial value of augend, in the ch3 reduction process circuit 58 are respectively set according to the above-described formula (4) with various data in previous channels (i.e. adjunct channels in opposite direction to the main scanning direction).

Thereby, when all pixel data after reduction process for one line of an image are aligned in the alignment order in the main scanning direction, skipping as a whole in the line is conducted with predetermined intervals (every sixth pixel, in the present embodiment). Therefore, when a reduced image or an image with low, resolution is recorded on a recording medium, an image with more preferable image quality can be obtained.

Moreover, reduction process by the reduction process unit 26 is conducted prior to various image process by the image process unit 30. Thereby, the number of pixel data dealt in the image process can be reduced, and processing load of the image process unit 30 can be reduced.

Second Embodiment

In the multifunction machine 1 of the above-described embodiment, the reduction process for pixel signals taken from the sampling control unit 25 is conducted mainly by the ch1, ch2 and ch3 reduction process circuit 56, 57 and 58 respectively provided for each channel. These reduction process circuits 56 to 58 respectively comprise an adder. Every time pixel data of corresponding channel are taken, predetermined addition is conducted, and pixel data are skipped when a carry bit does not occur from the addition result.

Contrastingly, in the present embodiment, rate of data reduction is fixed to a specific rate. Every time pixel data are inputted, a value of a counter is incremented. When the value of the counter reaches preset count value for skipping the pixel data inputted at that time are skipped. Therefore, except for the point that rate of data reduction is fixed (to ⅚ in the present embodiment), and the structure of the reduction process unit 26, the constitution of the multifunction machine 1 is basically the same as the multifunction machine 1 of the first embodiment. Thus, the reduction process unit 26 of the present embodiment will be described referring to FIGS. 10 and 11.

As shown in FIG. 10, the reduction process unit 26 of the present embodiment comprises: a decoder 91, ch1 to ch3 reduction process circuit 92 to 94 respectively provided for each channel; an OR circuit 95 that conducts OR calculation with output signals from reduction process circuits 92 to 94; and a latch 96.

The decoder 91 has exactly the same structure and function as those of the decoder 55 in the reduction process unit 26 of the first embodiment (shown in FIG. 7). The decoder 91 decodes channel flag (SP_FLG) and outputs select signals (R_SEL) to one of the above-described reduction process circuits 92 to 94 corresponding to a channel indicated by the result of decoding.

The following will describe structures of respective reduction process circuit 92 to 94. However, the structures thereof are the exactly the same, and only the structure of the ch1 reduction process circuit 92 will be described to represent others. The ch1 reduction process circuit 92 comprises an AND circuit 101, a comparator 103, ch1 initial value setting register 104, a counter 105, and an output logical circuit 102. The AND circuit 101 conducts logical multiplication with pixel data output signals (SP_RDY) and select signals (R_SEL1). The comparator 103 compares preset count value for skipping SUB and the count value (CNT1) of the counter 105, and outputs skip execution signals (high level signals) when both values becomes the same. In the ch1 initial value setting register 104, an initial value of the counter 106 (counter initial value) is set. In the counter 105, an initial value set in the ch1 initial value setting register 104 (counter initial value) is counted up (incremented) every time the level of an output from the AND circuit 61, i.e. renewal timing (CNT_EN1) becomes high. The output logical circuit 102 conducts logical multiplication with skip execution signals from the comparator 103 with the level reversed and the output from the AND circuit 61.

For the counter 105, a counter that counts in loop from 0 to (R−1) when rate of data reduction is (R−1)/R (R is a natural counting number equivalent to 2 or over) can be used. In the present embodiment, the rate of data reduction is fixed to ⅚. Thus, a counter that counts 0 to 5 in loop is used for the counter 105. For the count value for skipping SUB, any count value between 0 and 5 is preset, and "5" is set in the present embodiment. For the initial value of the counter 105 (counter initial value), "0" is set in the ch1 initial value setting register 104 in the present embodiment.

In the ch1 reduction process circuit 92 as constituted as above, every time pixel data corresponding to ch1 (SP_DATA) are inputted, level of an output from the AND circuit 101, i.e. renewal timing (CNT_EN1) becomes high. At this time if the count value CNT1 and the count value for skipping SUB are different, the level of skip execution signals become low, and the level of an output from the output logical circuit 102 becomes high. Consequently, the level of an output from the OR circuit 95 (RD_RDY) becomes high. Pixel data (SP_DATA) from the sampling control unit 25 and channel flag (SP_FLG) are latched by the latch 96 without being skipped, and outputted to the writing unit 28 as pixel data (RD_DATA) and channel flag (RD_FLG).

In the meanwhile, if the count value CNT1 when pixel data corresponding to ch1 (SP_DATA) and the count value for skipping SUB match up, the level of skip execution signals become high, and the level of an output from the output logical circuit 102 (R_RDY) becomes low. Consequently, the level of an output from the OR circuit 95 (RD_RDY) becomes low. Pixel data from the sampling control unit 25 (SP_DATA) are not latched by the latch 96 and therefore, skipped.

When pixel data corresponding to ch1 (SP_DATA) are taken, the level of renewal timing (CNT_EN1) become high. Thereby, the value of the counter 105 is incremented. The new incremented count value is used for determination whether or not forthcoming pixel data after the taken pixel data are to be skipped. In other words, determination whether or not taken pixel data are to be skipped is conducted by comparison between the count value CNT1 when the data are taken (i.e. the value before being incremented) and the count value for skipping SUB by the comparator 103.

Figure 11:
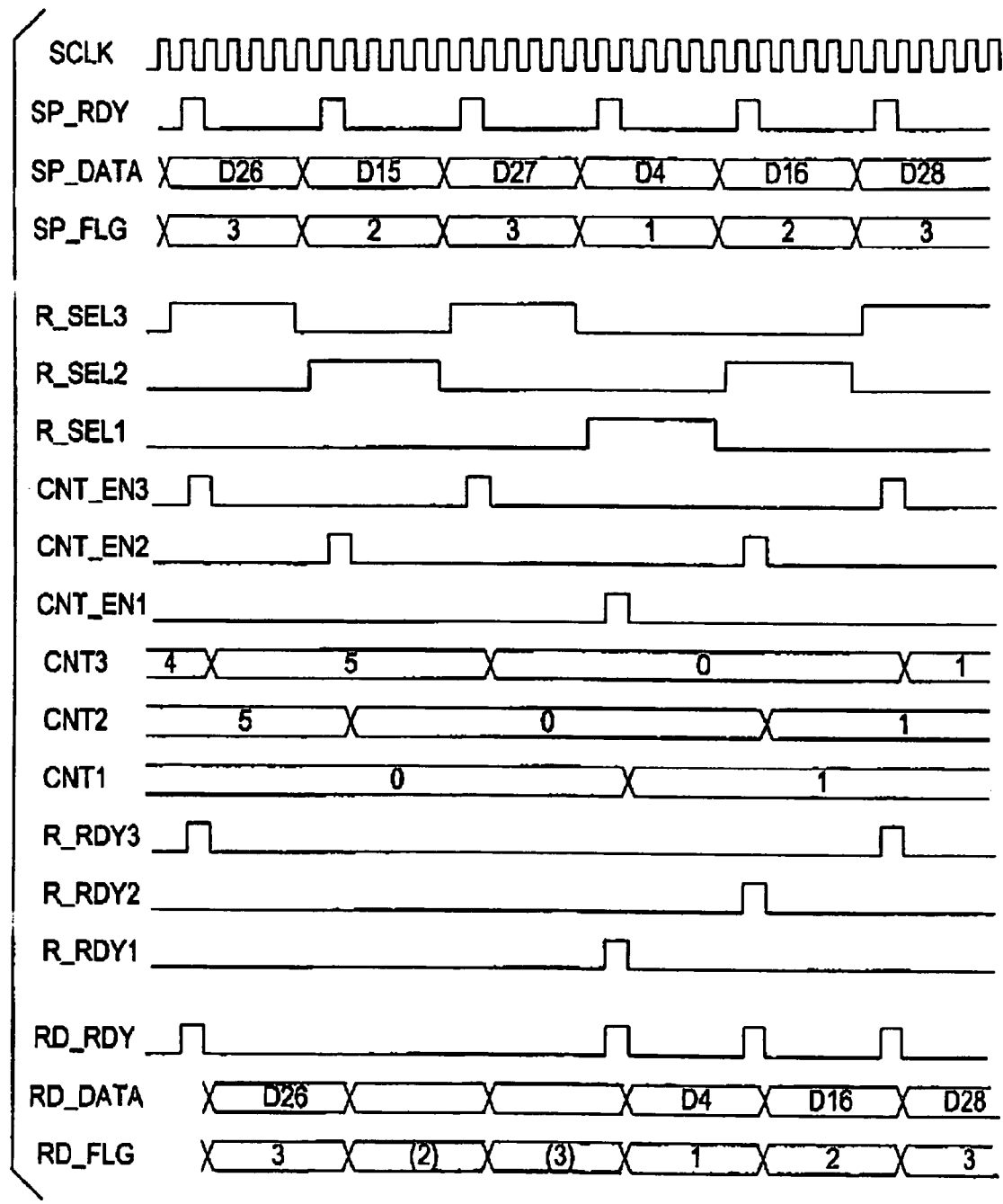
FIG. 11 is a time chart describing operation of the reduction process unit of the second embodiment.

As shown in FIG. 11, when the first valid pixel data D4 from ch1 are inputted, the count value of the counter 105 is the counter initial value "0". Thus, the level of skip execution signals is low, and the level of an output from the AND circuit 101, i.e. renewal timing (CNT_EN1) stays high. Thereby, the level of an output from the output logical circuit 102 (R_RDY1) becomes high, and pixel data D4 and channel flag (RD_FLG) indicating that the flag is corresponding to ch1 are outputted to the writing unit 28.

At this time, the count value of the counter 105 is incremented from "0" to "1". Setting the count initial value into the ch1 initial value setting register 104 and setting the count value for skipping SUB are conducted by CPU 21.

Accordingly, in the ch1 reduction process circuit 92, every time pixel data corresponding to ch1 are inputted, present count value and the count value for skipping SUB are compared, and the value of the counter 105 is incremented. The count process for ch1 becomes as shown in FIG. 12A. As pixel data D4, D5, D6, D7 . . . are sequentially inputted, the count value becomes 0, 1, 2, 3 . . . . When the sixth pixel data D9 are taken, the count value reaches 5, and matches up with the count value for skipping SUB. Therefore, the pixel data D9 are to be skipped.

The constitution and operation of the ch2 reduction process circuit 93 and the ch3 reduction process circuit 94 are the same as those of the ch1 reduction process circuit 92, and every time corresponding pixel data are taken, comparison by the comparators 113 and 123 are respectively conducted, and the count values are incremented. However, setting count initial values respectively set in the ch2 initial value setting register 114 and the ch3 initial value setting register 124 are significantly different from the case of ch1. The following will describe the setting method respective count initial values.

If the count initial values for ch2 and ch3 are voluntarily set in the same way as for ch1, when all pixel data for one line after reduction process are aligned in the sequence of the alignment in the main scanning direction, skip intervals in adjacent line sensors (adjacent channels) become irregular, and singularity might be caused in an image.

From this reason, in the present embodiment, setting values set in the ch2 initial value setting register 114 for ch2 and in the ch3 initial value setting register 124 for ch3 are determined so that skipping can be conducted with predetermined intervals on the whole (every sixth pixel in the present embodiment) when all pixel data for one line after reduction process are aligned in the sequence of alignment in the main scanning direction.

Specifically, residue from the following formula (5) is set as the count initial value corresponding to adjacent channel.

(Number of valid pixel+count initial value)/R    (5)

Applying this formula to the case of ch1, the count initial value for ch2 will be obtained. For ch1, the number of valid pixel is "8", and the count initial value is "0". Rate of data reduction=(R−1)/R=⅚. Thereby, R=6. Assigning these values into the formula, the calculation becomes (8+0)/6, and residue "2" is obtained. As shown in FIG. 12A, this residue "2" is the count value of the counter 105 after an increment when the last pixel data D11 from ch1 are inputted.

As shown in FIG. 12B, this value "2" is set as the count initial value for ch2 which is the adjacent channel next to ch1. When the first pixel data D12 from ch2 are taken, the count value CNT2 is equal to the above-described count initial value "2", thus does not math up with the count value for skipping "5". Thereby, pixel data D12 are outputted to the writing unit 28 without being skipped. At this point, the count value in the counter 115 is incremented from "2" to "3". The new count value "3" is compared with the count value for skipping when forthcoming pixel data from ch2 are taken.

Accordingly, in the ch2 reduction process circuit 93, comparison by the comparator 113 and increment in the counter 115 are repeated every time pixel data corresponding to ch2 are inputted. Consequently, the count process becomes as shown in FIG. 12B. As pixel data D12, D13, D14, D15 . . . are sequentially inputted, the count value becomes 2, 3, 4, 5 . . . . When pixel data D15 are inputted, the count value is "5", and equals to "5" of the count value for skipping SUB. Therefore, pixel data D15 are to be skipped. Likewise, the count value becomes "5" when pixel data D21 are inputted, and pixel data D21 are, therefore, to be skipped.

Extraction of the count initial value for ch3, that is the value set in the ch3 initial value setting register 124 in the ch3 reduction process circuit 94 is conducted in the same manner as the case for ch2. Specifically, applying the above-described formula (5) to ch2, initial value of augend of ch3 is obtained. In the case of ch2, the number of valid pixel is "12", and the count initial value is "2". Assigning these values into the above formula (5), the calculation becomes (12+2)/6, and residue "2" is obtained. This residue "2" is the count value of the counter 115 after an increment when the last pixel data D23 from ch2 are inputted, as shown in FIG. 12B.

As shown in FIG. 12C, this value "2" is set as the count initial value of the adjacent channel 3. When the first pixel data D24 from ch3 are inputted, the count value CNT3 is equivalent to the above-described count initial value "2", and does not match up with the count value for skipping "5". Thereby, the pixel data D24 are outputted to the writing unit 28 without being skipped. At this point, the count value in the counter 125 is incremented from "2" to "3". The new count value "3" is compared with the count value for skipping when forthcoming pixel data from ch3 are inputted.

Accordingly, in the ch3 reduction process circuit 94, every time pixel data corresponding to ch3 are inputted, comparison by the comparator 123 and increment in the counter 125 are repeated. Consequently, the count process for ch becomes as shown in FIG. 12C. As pixel data D24, D25, D26, D27 . . . are sequentially inputted, the count value becomes 2, 3, 4, 5 . . . . The count value when D27 are inputted is "5" and equals to the count value for skipping SUB, i.e. "5". Therefore, the pixel data D27 are to be skipped. Extraction and setting of count initial values for ch2 and ch3 are respectively conducted by CPU 21.

Skipping pixel data D15 from ch2 and pixel data D27 from ch3 are shown in FIG. 11. As shown therein, when D15 corresponding to ch2 are inputted from the sampling control unit 25 as pixel data (SP_DATA), the count value CNT2 of the counter 115 in the ch2 reduction process circuit 93 is "5" and equivalent to the count value for skipping. Thereby, the level of skip execution signals become high, the level of an output from the output logical circuit 112 (R_RDY2) remains low, and the level of an output from the OR circuit 95 (RD_RDY) also remains low. Therefore, pixel data D15 are skipped without being latched by the latch 96.

Moreover, when pixel data (SP_DATA) D27 corresponding to ch3 are inputted from the sampling control unit 25, the count value (CNT3) of the counter 125 in the ch3 reduction process circuit 94 becomes "5", and matches with the count value for skipping. The level of skip execution signals becomes high, and the level of an output (RD_RDY3) from the output logical circuit 95 remains low, and the level of an output from the OR circuit 95 (RD_RDY) also remains low. Therefore, pixel data D27 are skipped without being latched by the latch 96.

As described above, in the present embodiment, pixel data are skipped in case that the count value when the pixel data are inputted is equivalent to the skip execution count value SUB. Therefore, the reduction process unit 26 can have relatively simple constitution, and this simple constitution of the reduction process unit 26 leads to simplify the structure of the entire multifunction machine 1.

It is to be noted that the present invention is not limited to the above-described embodiments, and variations and modifications can be adopted within the technical scope of the present invention. Some examples are given below.

In the above-described first embodiment, skipping is conducted when a carry bit does not occur. Contrastingly, skipping of pixel data can be conducted when a carry bit occurs. In this case, addition value and initial value of augend can be respectively set so that a carry bit occurs in every predetermined interval described above (every sixth pixel).

In the above-described second embodiment, when pixel data corresponding to ch1 are inputted, the count value CNT1 already inputted in the comparator 103 and the count value for skipping SUB are compared, and determination whether or not the pixel data are to be skipped based on the comparison result is conducted. The count value after an increment is used to determine whether or not forthcoming pixel data are to be skipped. This determination can be made based on a new count value which is incremented at the time of every loading of pixel data.

Specifically, in ch1, for example, the count value can be undetermined until the fourth pixel data D4 are inputted, and when D4 are inputted, the count value can be counted up for the first time (set to the count initial value "0", from undetermined state (incremented)). Pixel data with count value "0" are not to be skipped, thus D4 are outputted. From then on, every time data corresponding to ch1 are inputted, the value of the counter 105 is incremented and new count value is referred to determine whether or not skipping is to be conducted. The same setting can be applied for ch2 and ch3.

Furthermore, in the above-described second embodiment, the rate of data reduction is fixed to (R−1)/R. The rate of data reduction can be fixed to m/R (m<R), and the same counter which counts 0 to (R−1) in loop can be used. The reduction process can be conducted by suitably setting the count value for skipping depending on the rate of data reduction.

For example, in case the rate of data reduction is fixed to ⅓, counters that can count 0 to 2 in loop can be used respectively for counters 105, 115 and 125. In this case, the count value for skipping can be set so that when three pixel data are sequentially inputted, two of the data are skipped and one of the data are outputted. The count value for skipping can be set, for example, to 1 or 2.

Still furthermore, in the respective embodiments described above, three line sensors with twelve light receivers disposed adjacent to one another in the main scanning direction are described as the line image sensor 11. It goes without saying that the number of light receivers of respective line sensors, and the number of line sensors constituting one line image sensor are not limited to the numbers given in the above embodiments.

Figure 13:
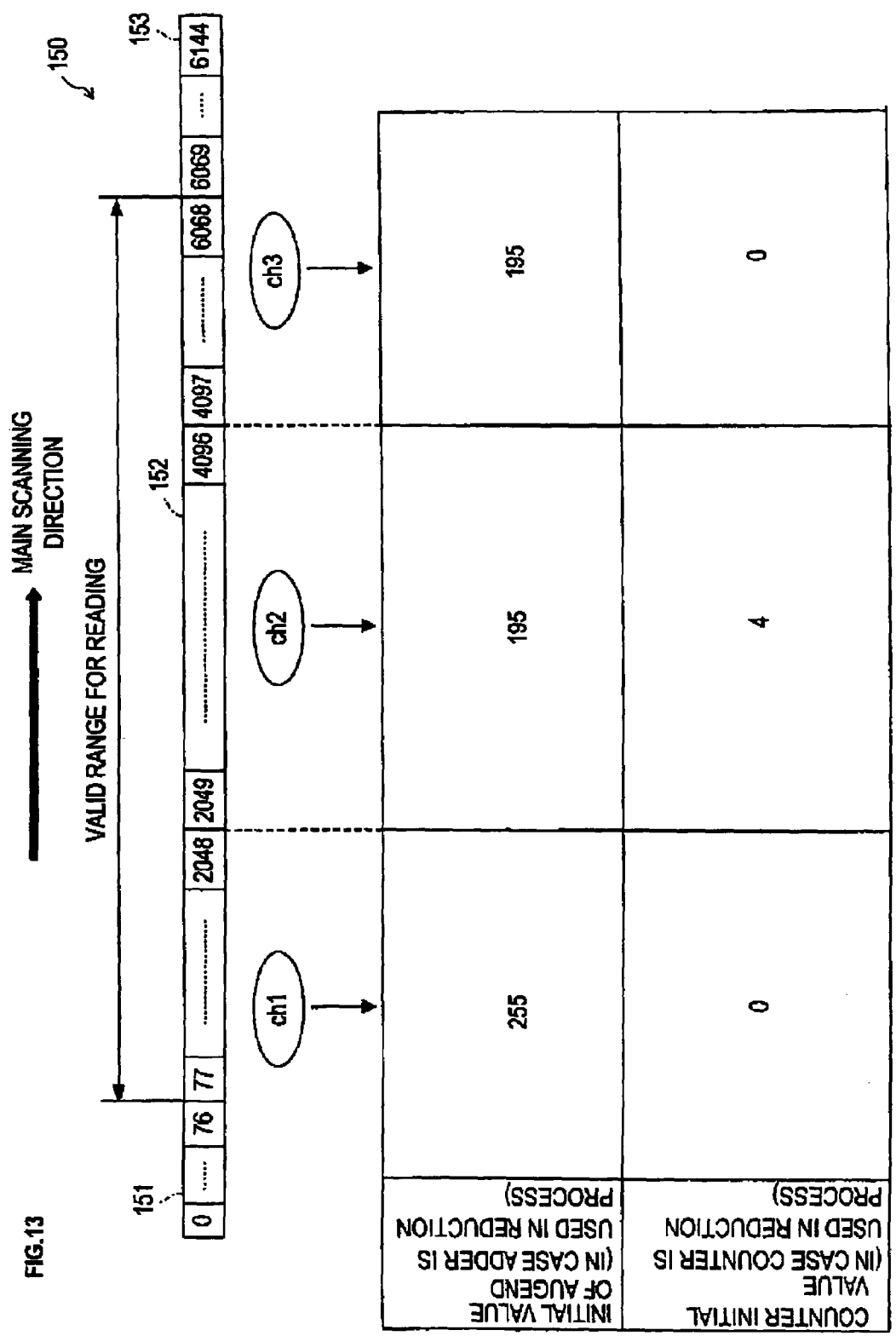
FIG. 13 is an explanatory view showing a variation of the line image sensor, and corresponding initial value of augend and count initial value.

One example is shown in FIG. 13. The line image sensor 150 therein comprises three line sensors (for three channels) with 2048 light receivers. As shown in FIG. 13, in this line image sensor 150, valid pixel of line sensor 151 for ch1 are 77 to 2048, valid pixel of line sensor 152 for ch2 are 2049 to 4096, and valid pixel of line sensor 153 for ch3 are 4097 to 6068.

If this line image sensor 150 shown in FIG. 13 is used in the first embodiment described above, based on the formula (4), the initial values of augends for ch2 and ch3 can be extracted in the same manner as described above. Specifically, as shown in FIG. 13, the initial value of augend for ch2 becomes "195", and the initial value of augend for ch3 also becomes "195".

Applying the above-described formula (4) to the case of ch1, the initial value of augend for ch2 is obtained. In ch1, the number of valid pixel is "1972", and the initial value of augend is "255". Assigning these values into the formula (4), the calculation becomes (213×1972+255)/256, and residue "195" is obtained. Applying the formula (4) to the case of ch2, the initial value of augend is obtained. In ch2, the number of valid pixel is "2048", and the initial value of augend is "195". Assigning these values into the formula (4), the calculation becomes (213×2048+195)/256, and residue "195" is obtained.

If this line image sensor 150 is used in the second embodiment described above, the count initial values for ch2 and ch3 can be extracted based on the above-described formula (5).

Specifically, as shown in FIG. 13, the count initial value for ch2 becomes "4", and the count initial value for ch3 becomes "0".

Applying the formula (5) to the case of ch1, the count initial value for ch2 is obtained. In ch1, the number of valid pixel is "1972", and the count initial value is "0". Assigning these values into the formula (5), the calculation becomes (1972+0)/6, and residue "4" is obtained. Applying the formula (5) to the case of ch2, the count initial values for ch3 is obtained. In ch2, the number of valid pixel is "2048", and the count initial value is "4". Assigning these values into the formula (5), the calculation becomes (2048+4)/6, and residue "0" is obtained.

In the above-described embodiments, specific cases wherein an original in B4 size is read and recording is conducted on a recording medium in A4 size are described. However, the sizes of an original and a recording medium can be chosen voluntarily, and reading and recording can be conducted for any size.

As mentioned above, although only some exemplary embodiments of the present invention have been described in detail above, those skilled in the art will be readily appreciated that many modifications are possible in the exemplary embodiments without materially departing from the novel teachings and advantages of the present invention. Accordingly, all such modifications are intended to be included within the scope of the present invention.

What is claimed is:

1. An image reading apparatus comprising:
   an image sensor with plurality of line sensors disposed in a direction, each of the line sensors having light receivers for each pixel aligned in the direction;
   output devices for respective line sensors that output pixel signals obtained from the respective light receivers constituting the line sensors in an alignment order of the light receivers;
   a conversion device that converts pixel signals outputted from the respective output devices into digital pixel data and outputs the pixel data;
   a data storage memory capable of storing pixel data;
   a data reduction rate setting device that sets data reduction rate indicating rate of pixel data to be written amongst the pixel data outputted from the conversion device;
   reduction devices for respective line sensors that take pixel data from corresponding line sensors amongst pixel data outputted from the conversion device, and output only predetermined number of pixel data according to data reduction rate set in the data reduction rate setting device amongst the respective taken pixel data; and
   a writing device that writes pixel data outputted from the reduction devices into the data storage memory.

2. The image reading apparatus as set forth in claim 1, wherein the respective reduction devices take the pixel data taken from corresponding line sensors and outputted from the conversion device in the alignment order of the light receivers constituting the line sensors, and sequentially output the taken pixel data while skipping with predetermined intervals according to the data reduction rate.

3. The image reading apparatus as set forth in claim 2 further comprising an offset setting device that respectively sets timings for skipping in respective reduction devices so that when pixel data outputted by the reduction devices are aligned in the alignment order of the line sensors and the alignment order light receivers, the aligned pixel data as a whole can be skipped with the predetermined intervals.

4. The image reading apparatus as set forth in claim 2 wherein the reduction devices respectively comprise:
   an addition device with n+1 bits (n is a natural number) that adds a n-bits augend and n-bits additional value, and determines low n-bit of addition result as the augend in next addition;
   a carry determination device that determines whether or not a carry is generated from the addition by the addition device; and
   a skip setting device that skips pixel data corresponding to a determination by the carry determination device indicating a carry has not been generated, and prevents skipped pixel data from being outputted,
   wherein initial values of the additional value and the augend are respectively set so that a carry is not generated with the predetermined intervals in the addition conducted by the addition device every time the pixel data are loaded.

5. The image reading apparatus as set forth in claim 4 further comprising:
   an addition value setting device that sets integer part of multiplication result obtained by multiplying the data reduction rate by $2^n$ as the additional value; and
   an offset setting device that sets predetermined value in $0 \sim 2^n \cdot 1$ as initial value of the augend for the reduction device corresponding to a first line sensor amongst the line sensors aligned in the direction, and sets residue of division result obtained from formula (1) in the reduction device as initial value of the augend in the reduction device corresponding to next line sensor, $$(b \cdot k + a)/2^n \qquad (1)$$

in the above formula, b represents the additional value, k represents the number of valid pixel to output only valid pixel signals from light receivers constituting the line sensor corresponding to the reduction device, and a represents the initial value of the augend set in the reduction device.

6. The image reading apparatus as set forth in claim 2 wherein the data reduction rate setting device is capable of setting the data reduction rate to m/R (both m and R are natural numbers, and m<R),
   wherein the reduction devices respectively comprise:
   a counter that counts 0~(R−1) in loop every time the pixel data are inputted from the conversion device;
   an execution determination device that determines whether or not count value of the counter is equivalent to a predetermined skipping execution value; and
   a skip setting device that skips the pixel data corresponding to a determination made by the execution determination device indicating the counter value has reached the skipping execution value, and prevents skipped pixel data from being outputted,
   wherein more than one skipping execution value is set so that the count value reaches the skipping execution value in every predetermined interval.

7. The image reading apparatus as set forth in claim 2 wherein the data reduction rate setting device is capable of setting the data reduction rate to (R−1)/R (R is a natural number equivalent to 2 or larger),
   wherein the reduction devices respectively comprise:
   a counter that counts 0~(R−1) in loop every time the pixel data are inputted from the conversion device;
   an execution determination device that determines whether or not count value of the counter is equivalent to a predetermined skipping execution value; and
   a skip setting device that skips the pixel data corresponding to a determination made by the execution determination device indicating the counter value has reached the skipping execution value, and prevents the skipped pixel data from being outputted, wherein the reduction devices respectively furthermore comprise a execution value setting device that sets cross-device skipping execution value for all the reduction devices.

8. The image reading apparatus as set forth in claim 7, furthermore comprising counter initial value setting devices for the respective reduction devices that respectively set initial values of the counters of the reduction devices, wherein the counter initial value setting device sets a predetermined value in 0~(R−1) as the initial value of the counter of the reduction device corresponding to a first line sensor amongst the line sensors aligned in the main scanning direction, and wherein the counter initial value setting device furthermore sets residue of division result obtained with a formula (2) as initial value of the counter of the reduction device corresponding to next line sensor, $$(k+c)/R \qquad (2)$$

in the above formula, k represents the number of valid pixel to output only valid pixel signals from light receivers constituting the line sensor corresponding to the reduction device, and c represents the initial value of the counter set in the reduction device.

* * * * *